United States Patent
Price et al.

(10) Patent No.: US 10,752,213 B2
(45) Date of Patent: Aug. 25, 2020

(54) DETECTING AN EVENT AND AUTOMATICALLY OBTAINING VIDEO DATA

(71) Applicant: Capital One Services, LLC, McLean, VA (US)

(72) Inventors: Micah Price, Anna, TX (US); Qiaochu Tang, The Colony, TX (US); Stephen Wylie, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/243,499

(22) Filed: Jan. 9, 2019

(65) Prior Publication Data

US 2020/0216026 A1    Jul. 9, 2020

(51) Int. Cl.
*H04N 7/18* (2006.01)
*H04N 21/472* (2011.01)
(Continued)

(52) U.S. Cl.
CPC .......... *B60R 25/302* (2013.01); *B60R 25/102* (2013.01); *B60R 25/305* (2013.01);
(Continued)

(58) Field of Classification Search
CPC ........... H04M 1/72569; H04M 1/0264; H04M 1/72522; H04M 1/7253; H04M 1/72572; H04M 2207/18; H04M 2242/14; H04M 3/54; B60R 25/102; B60R 25/30; B60R 25/33; B60R 25/1012; G06K 9/0053; G08B 13/19467; H04L 67/12; H04N 5/23218;
(Continued)

(56) References Cited

U.S. PATENT DOCUMENTS

2008/0204556 A1    8/2008    de Miranda et al.
2012/0162423 A1    6/2012    Xiao et al.
(Continued)

OTHER PUBLICATIONS

Business Wire, "Owl Launches first Security Camera for Your Car", https://www.businesswire.com/news/home/20180201005401/en/Owl-Launches-Security-Camera-Car, Feb. 1, 2018, 3 pages.
(Continued)

*Primary Examiner* — Alison Slater
(74) *Attorney, Agent, or Firm* — Harrity & Harrity, LLP

(57) ABSTRACT

A server device obtains, from a primary device associated with a first vehicle, event data concerning an event, video data concerning the event, and/or location data concerning a location of the first vehicle. The server device processes the event data to determine a type of the event, and determines, based on the type of the event and the location data, a proximity zone around the location of the first vehicle. The server device determines additional devices within the proximity zone, where each additional device is associated with a different vehicle. The server device sends, to the additional devices, a message requesting additional video data concerning the event, and obtains the additional video data from at least one additional device. The server device performs, based on relevant event information based on the event data, the video data, and the additional video data, an action concerning the event.

20 Claims, 8 Drawing Sheets

(51) Int. Cl.
| | |
|---|---|
| *H04N 21/61* | (2011.01) |
| *H04N 5/232* | (2006.01) |
| *H04N 5/247* | (2006.01) |
| *G07C 5/00* | (2006.01) |
| *G07C 9/00* | (2020.01) |
| *B60R 21/013* | (2006.01) |
| *B60R 11/04* | (2006.01) |
| *B60R 25/102* | (2013.01) |
| *B60R 25/31* | (2013.01) |
| *G06F 11/07* | (2006.01) |
| *G08B 13/196* | (2006.01) |
| *G08B 25/00* | (2006.01) |
| *G08B 31/00* | (2006.01) |
| *B60R 25/30* | (2013.01) |
| *B60R 25/33* | (2013.01) |

(52) U.S. Cl.
CPC .......... *B60R 25/33* (2013.01); *G08B 13/1966* (2013.01); *G08B 13/19602* (2013.01); *G08B 13/19647* (2013.01); *B60R 2325/40* (2013.01)

(58) Field of Classification Search
CPC ......... H04W 4/023; H04W 4/38; H04W 4/44; H04W 4/90
See application file for complete search history.

(56) References Cited

U.S. PATENT DOCUMENTS

| | | | | |
|---|---|---|---|---|
| 2013/0342333 | A1* | 12/2013 | Hutchings | G08G 1/096791 340/435 |
| 2014/0085107 | A1* | 3/2014 | Gutierrez | G08G 1/096766 340/905 |
| 2014/0214832 | A1* | 7/2014 | Nandakumar | G06F 16/95 707/737 |
| 2014/0225719 | A1* | 8/2014 | Kesavan | B60Q 1/00 340/425.5 |
| 2015/0248836 | A1* | 9/2015 | Alselimi | G06K 9/00785 348/149 |
| 2016/0318476 | A1* | 11/2016 | Cogill | B60R 25/30 |
| 2016/0318516 | A1* | 11/2016 | Tuukkanen | B60W 30/09 |
| 2017/0021760 | A1* | 1/2017 | Calnek | H04W 4/02 |
| 2017/0053461 | A1* | 2/2017 | Pal | G07C 5/008 |
| 2018/0220189 | A1* | 8/2018 | Hodge | G08B 13/19613 |
| 2018/0367958 | A1* | 12/2018 | Dizdarevic | G08G 1/012 |
| 2019/0051178 | A1* | 2/2019 | Priev | G08G 1/162 |
| 2019/0052747 | A1* | 2/2019 | Breaux | H04M 1/72577 |
| 2019/0058849 | A1* | 2/2019 | Watanabe | G08G 1/0175 |
| 2019/0077353 | A1* | 3/2019 | Lopez | B60R 21/0132 |
| 2019/0098635 | A1* | 3/2019 | Sarwar | H04W 72/082 |

OTHER PUBLICATIONS

"Technical Specifications—Owl Cameras", https://owlcam.com/pages/technical-specifications, Oct. 23, 2018, 6 pages.

* cited by examiner

DETECTING AN EVENT AND AUTOMATICALLY OBTAINING VIDEO DATA

BACKGROUND

A vehicle may include a detecting device, a camera device, and/or a global positioning system (GPS) device. The detecting device may detect an event, the camera device may obtain video data concerning the event, and the GPS device may obtain location data concerning a location.

SUMMARY

According to some implementations, a method may include obtaining, by a primary device and from a detecting device, event data concerning an event, wherein the primary device and the detecting device are associated with a first vehicle, and determining, by the primary device and based on the event data, a type of the event. The method may include obtaining, by the primary device and from a camera device, and based on the type of the event, video data concerning the event, wherein the camera device is associated with the first vehicle. The method may include obtaining, by the primary device and from a location device, and based on the type of the event, location data concerning a location of the first vehicle, wherein the location device is associated with the first vehicle. The method may include sending, by the primary device and based on the type of the event, a message to a plurality of additional devices, wherein each additional device, of the plurality of additional devices, is associated with a vehicle different from the first vehicle, and wherein the message requests at least one additional device, of the plurality of additional devices, to obtain at least one of additional event data concerning the event, additional video data concerning the event, or additional location data concerning a location of a vehicle with which the at least one additional device is associated, and to send the at least one of the additional event data, the additional video data, or the additional location data to a server device. The method may include sending, by the primary device, the type of the event, the video data, and the location data to the server device to cause the server device to process the event data, the video data, the location data, and the at least one of the additional event data, the additional video data, or the additional location data to determine relevant event information. The method may include obtaining, by the primary device and from the server device, the relevant event information, and causing, by the primary device, storage of the relevant event information.

According to some implementations, a server device may include one or more memories, and one or more processors, communicatively coupled to the one or more memories, to obtain event data concerning an event from a primary device associated with a first vehicle. The one or more processors may obtain video data concerning the event from the primary device associated with the first vehicle, and may obtain location data concerning a location of the first vehicle from the primary device associated with the first vehicle. The one or more processors may process the event data to determine a type of the event, and may determine, based on the type of the event and the location data, a proximity zone around the location of the first vehicle. The one or more processors may determine a plurality of additional devices within the proximity zone, wherein each additional device, of the plurality of additional devices, is associated with a vehicle different from the first vehicle, and may send to the plurality of additional devices a message requesting additional video data concerning the event. The one or more processors may obtain the additional video data concerning the event from at least one additional device of the plurality of additional devices. The one or more processors may process the event data, the video data, and the additional video data to determine relevant event information, and may perform, based on the relevant event information, an action concerning the event.

According to some implementations, a non-transitory computer-readable medium may store instructions that include one or more instructions that, when executed by one or more processors of a device, cause the one or more processors to receive a first message from a primary device associated with a primary vehicle via a wireless communication protocol. The one or more instructions may cause the one or more processors to obtain, based on the first message, location data concerning a location of the vehicle from a location device associated with the vehicle. The one or more instructions may cause the one or more processors to determine, based on the first message and the location data, that the location of the vehicle is within a proximity zone of the primary vehicle. The one or more instructions may cause the one or more processors to cause, based on determining that the location of the vehicle is within the proximity zone of the primary vehicle, a camera device associated with the vehicle to capture video data. The one or more instructions may cause the one or more processors to send, to the primary device and via the wireless communication protocol, a second message that indicates that the location of the vehicle is within the proximity zone, and to receive, from the primary device and via the wireless communication protocol, a third message that indicates a type of an event and an interval of time. The one or more instructions may cause the one or more processors to obtain, based on the interval of time and from the camera device, the video data during the interval of time, and to send the video data to a server device to cause the server device to perform an action concerning the type of the event.

DETAILED DESCRIPTION

Figure 1A:
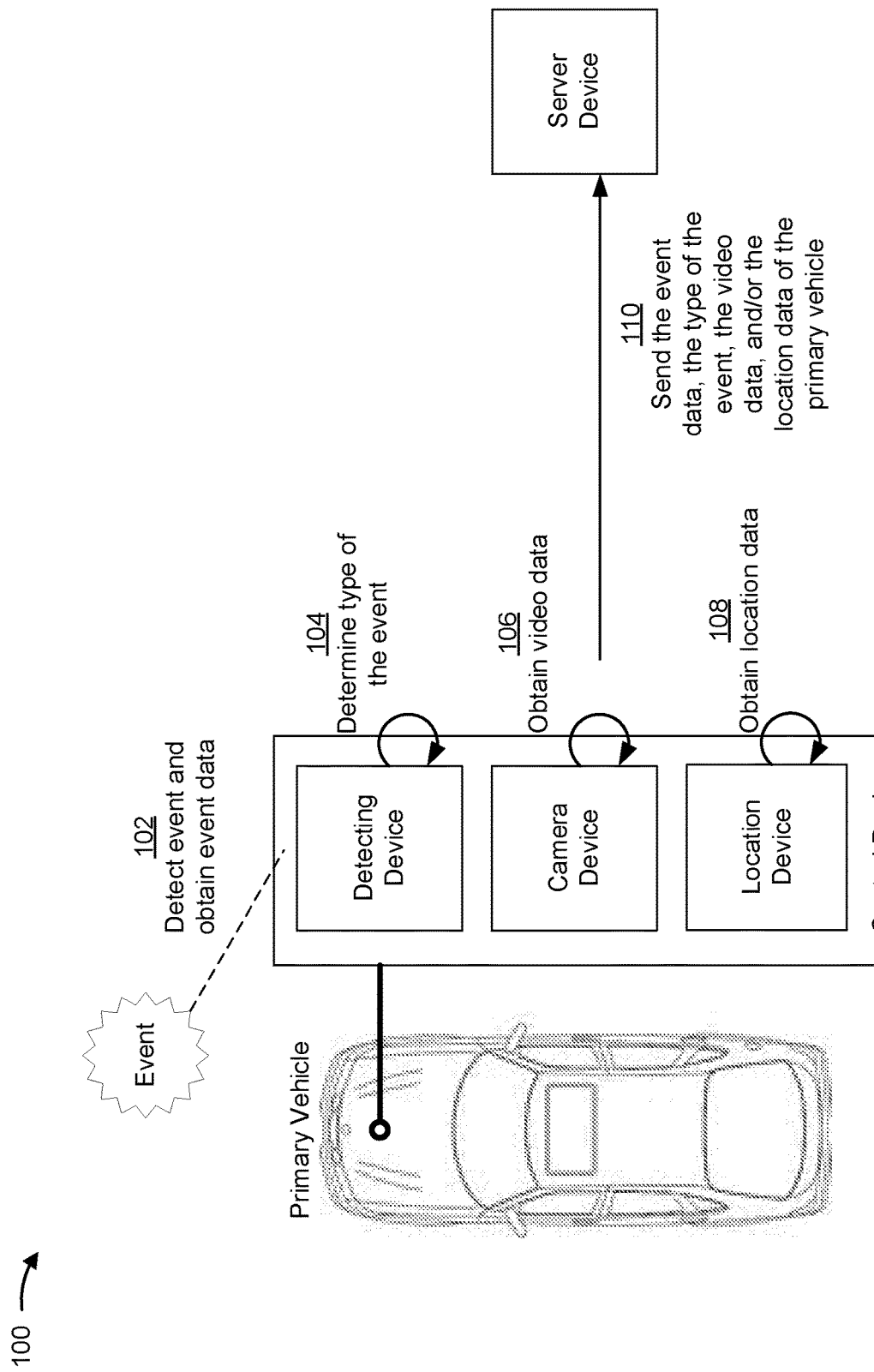
FIGS. 1A-1C are diagrams of example implementations described herein.

The following detailed description of example implementations refers to the accompanying drawings. The same reference numbers in different drawings may identify the same or similar elements.

An unoccupied vehicle, such as a parked vehicle, may be subject to an illegal and/or physically damaging event. For example, in some cases, the vehicle may be subject to a break-in attempt, a hit-and-run accident, a broken window, and/or the like. In some cases, the vehicle is equipped with a camera device, such as a dashboard camera, to obtain video data, but the camera device is not able to capture useful video data that concerns the event. For example, where the event concerns damage to a back of the vehicle and the camera device is configured to obtain video data concerning a front of the vehicle and/or a road that the vehicle is travelling on, the camera device cannot obtain video data concerning the back of the vehicle. In some cases, the obtainable video data is not useful in helping to determine what caused the event and/or how the event occurred.

Some implementations, described herein, provide for a control device of a primary vehicle to obtain video data concerning an event and to communicate with a control device of at least one additional vehicle for the control device of the additional vehicle to obtain additional video data concerning the event. In some implementations, the control device of the primary vehicle may control: a detecting device to detect the event and obtain event data; a camera device to obtain video data concerning the event; and a location device to obtain location data concerning a location of the primary vehicle. In some implementations, the control device of the primary vehicle may notify the control device of at least one additional vehicle to obtain additional event data concerning the event, additional video data concerning the event, and/or additional location data concerning a location of the at least one additional vehicle. In some implementations, the control device of the primary vehicle and/or a server device may process the event data to determine a type of the event. In some implementations, the control device of the primary vehicle may send the event data, the type of the event, the video data, and the location data to the server device, and the control device of the at least one additional vehicle may send the additional event data, the additional video data, and the additional location data to the server device. In some implementations, the server device and/or the control device may determine relevant information and cause display of the relevant information and/or perform an action based on the relevant event information.

In this way, some implementations described herein may provide an owner of the primary vehicle with extensive information about an event that may have affected the primary vehicle. Further, some implementations provide the owner, an insurance agent, an emergency services provider, and/or the like with information about the primary vehicle as an event happens or soon after the event happens. This may reduce a time to review and/or a time to respond to the event by the owner, the insurance agent, the emergency services provider, and/or the like, which may prevent and/or reduce damage to the primary vehicle, enable quicker repair of the primary vehicle, prevent and/or reduce harm to a person, enable quicker identification and/or location of a bad actor, and/or the like.

In this way, the process for determining the type of the event is automated and the control device of the primary vehicle and/or the server device may determine numerous (e.g., tens, hundreds, thousands, and/or the like) types of events in a period of time (e.g., an afternoon, an evening, a day, a week, and/or the like). This may improve speed and efficiency of the process for determining the type of the event and conserve computing resources (e.g., processor resources, memory resources, and/or the like) of the control device of the primary vehicle and/or the server device. Furthermore, implementations described herein use a rigorous, computerized process to perform tasks or roles that were not previously performed or were previously performed using subjective human intuition or input. For example, currently there does not exist a technique to automatically determine a type of an event to obtain video data and/or additional video data concerning the event and determine relevant event information. Finally, automating the process for determining the type of the event conserves computing resources (e.g., processor resources, memory resources, and/or the like) that would otherwise be wasted in attempting to assist a human in determining the type of the event.

Figure 1B:
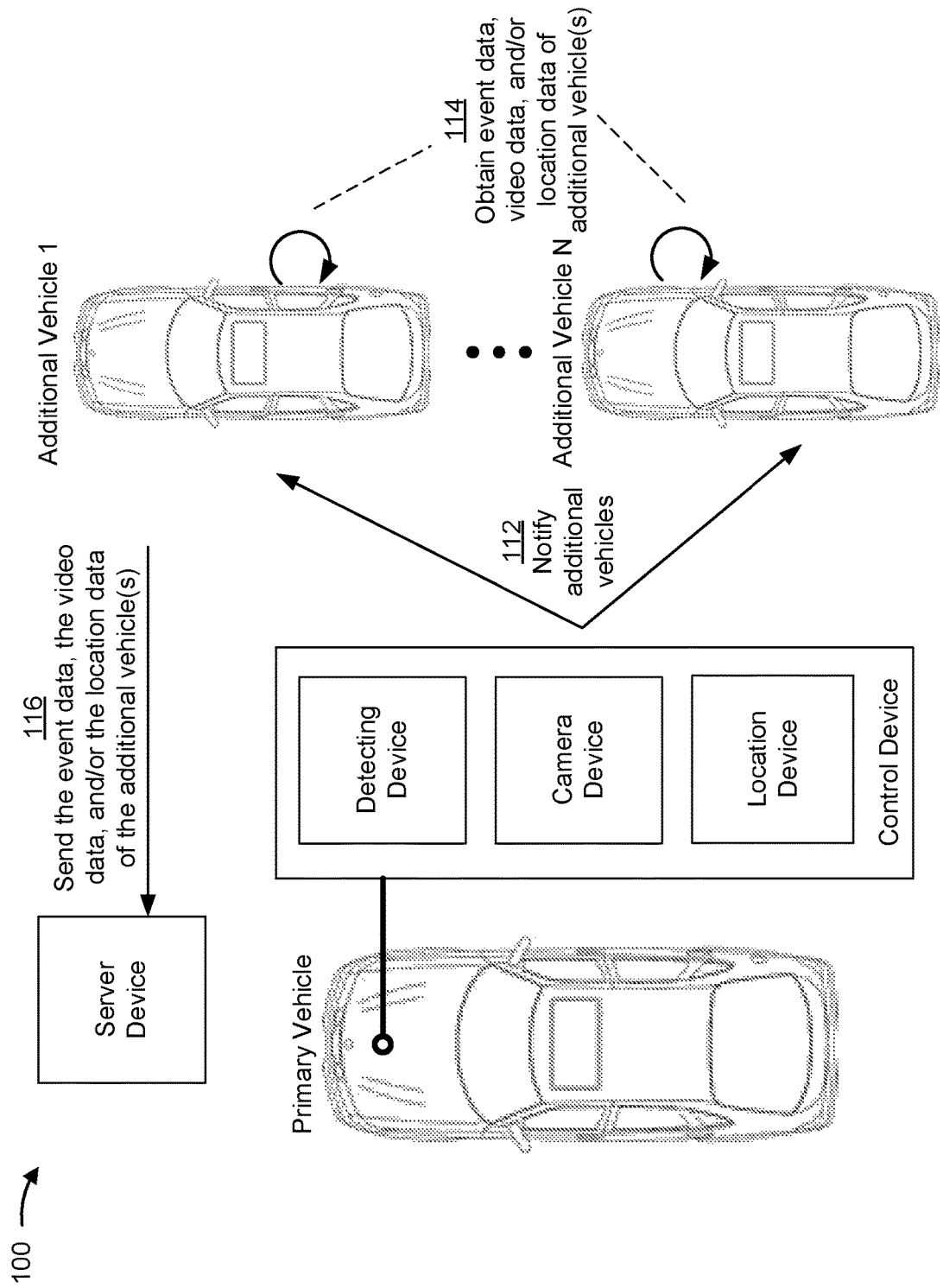
Figure 1C:
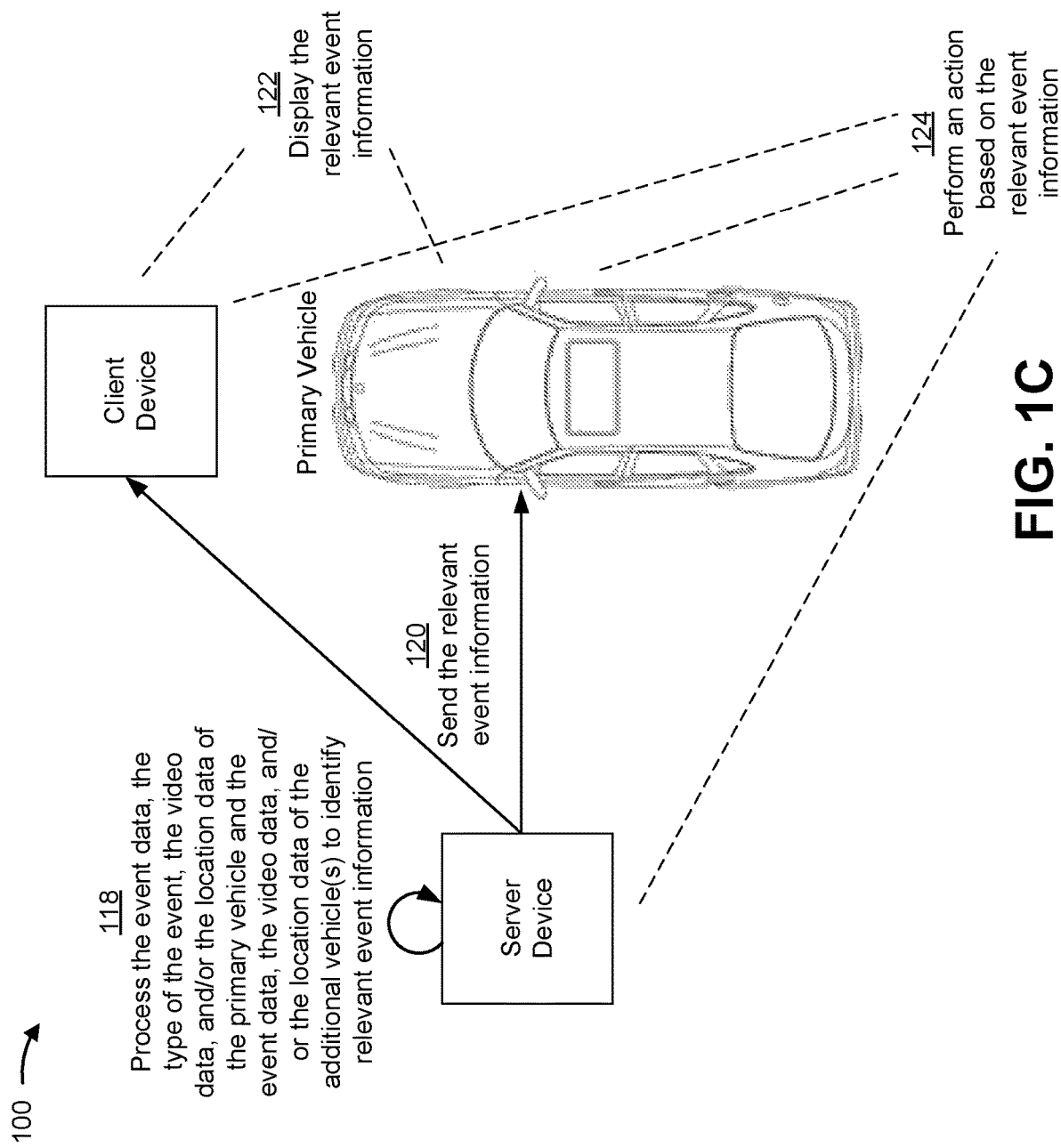

FIGS. 1A-1C are diagrams of an overview of an example implementation 100 described herein. As shown in FIGS. 1A-1C, example implementation 100 may include a primary vehicle, a server device, a client device, and/or one or more additional vehicles (shown as additional vehicle 1 to additional vehicle N). In some implementations, a vehicle, such as the primary vehicle and/or the one or more additional vehicles, may include a detecting device, a camera device, a location device, and/or the like that is capable of obtaining data concerning an event and/or the vehicle. In some implementations, a vehicle, such as the primary vehicle and/or the one or more additional vehicles, may include a control device that controls and/or communicates with the detecting device, the camera device, the location device, and/or the like of the vehicle.

In some implementations, the control device of the primary vehicle, the server device, the client device, and/or the respective control device of each of the one or more additional vehicles may communicate with each other using a wired connection, a wireless connection, or a combination of wired and wireless connections. For example, the control device of the primary vehicle, the server device, the client device, and/or the respective control device of each of the one or more additional vehicles may communicate with each other via a cellular connection, such as a 3G connection, a 4G connection, a long term evolution (LTE) connection, a 5G connection, and/or the like. As another example, the control device of the primary vehicle, the server device, the client device, and/or the respective control device of each of the one or more additional vehicles may communicate via a non-cellular connection, such as a Wi-Fi connection, a Bluetooth® connection (e.g., a Bluetooth® connection that supports mesh networking), a Zigbee connection (e.g., a Zigbee connection that support mesh networking), and/or the like.

In some implementations, a detecting device of a vehicle may include a microphone, a sound level meter, a camera device, a motion detector, a heat detector, a smoke detector, a shock or vibration sensor, a contact sensor (e.g., that obtains contact data indicating that the contact sensor has experienced contact by an object), a chemical sensor (e.g., that obtains indicating that the chemical sensor has detected a particular chemical and/or chemicals in the air, such as chemicals consistent with a gas leak, an antifreeze leak, a coolant leak, and/or the like), and/or the like. In some implementations, the detecting device may detect that an event has occurred and/or obtain event data concerning the event. In some implementations, the detecting device may be mounted on, integrated into, and/or affixed to a vehicle (e.g., on a dashboard of the vehicle, on a windshield of the vehicle, in a bumper of the vehicle, in a door handle of the vehicle, and/or the like). In some implementations, the detecting device may use or be part of another device of a vehicle, such as a radar device, a camera device, a light detection and ranging (Lidar) device, and/or the like. In some implementations, a control device of the vehicle may control the detecting device and/or communicate with the detecting device.

In some implementations, a camera device of a vehicle may include one or more cameras (e.g., one or more of a dashboard camera, sometimes referred to as a "dash cam," a video camera, a backup camera, a rearview camera, a lane monitoring camera, a blind spot camera, and/or the like). In some implementations, the camera device may obtain video data concerning an event. In some implementations, the camera device may include a memory, such as a circular buffer, and the camera device may continuously obtain the video data and continuously store the video data in the memory as the camera device obtains the video data. In some implementations, the memory stores only recent video data (e.g., 15 minutes of the most recently obtained video data) and deletes old video data (e.g., video data older than 15 minutes). In some implementations, the camera device may obtain video data from a front of the vehicle, a back of the vehicle, a side of the vehicle, and/or the like. In some implementations, the one or more cameras of the camera device may be controlled to move (e.g., pivot on a pivot point) and/or adjust focus to obtain video data concerning a subject and/or area. In some implementations, the camera device may obtain video data concerning an area around the vehicle, such as a field of view of a camera of the one or more cameras of the camera device, a 360 degree area view around the vehicle, and/or the like. In some implementations, the camera device may be mounted on, integrated into, and/or affixed to the vehicle (e.g., on a dashboard of the vehicle, on a windshield of the vehicle, in a bumper of the vehicle, in a side mirror of the vehicle, and/or the like). In some implementations, a control device of the vehicle may control the camera device and/or communicate with the camera device.

In some implementations, a location device (e.g., a global positioning system (GPS) device) of a vehicle may include one or more sensors that may detect a location of the vehicle. In some implementations, the location device may obtain location data. In some implementations, the location data may include the location of the vehicle (e.g., represented as a latitude and longitude pair), a time of the location of the vehicle (e.g., when the vehicle is at the location), a heading of the vehicle (e.g., which way the vehicle is pointing, such as in degrees from north, where north is represented by 0 degrees), a distance from a last recorded location of the vehicle, and/or the like. In some implementations, the location device may be mounted on, integrated into, and/or affixed to the vehicle (e.g., on a dashboard of the vehicle, on a windshield of the vehicle, in a bumper of the vehicle, in a head unit of the vehicle, and/or the like). In some implementations, a control device of the vehicle may control the location device and/or communicate with the location device.

As shown in FIG. 1A and by reference number 102, a detecting device of the primary vehicle may detect an event, such as a window of the primary vehicle breaking, a forceful opening of a door, a trunk, a glovebox, and/or the like of the primary vehicle (e.g., via a crowbar and/or the like), an unauthorized unlocking of the primary vehicle (e.g., via a coat hanger and/or the like), a different vehicle hitting the primary vehicle (e.g., the different vehicle backing into the primary vehicle), a person vandalizing the primary vehicle (e.g., keying the primary vehicle), and/or the like. In some implementations, the detecting device of the primary vehicle may obtain event data concerning the event to detect the event. For example, where the detecting device is a microphone, the detecting device may obtain audio data to detect a sound associated with an event (e.g., a frequency of a sound associated with breaking glass). As another example, where the detecting device is a sound level meter, the detecting device may obtain sound level data to detect an event by determining that the sound level associated with the event satisfies a threshold (e.g., a loud "crashing" sound associated with the different vehicle hitting the primary vehicle). In another example, where the detecting device includes a heat detector and a chemical sensor, the detecting device may obtain chemical data and heat data to detect an imminent fire event (e.g., by detecting chemicals in the air that indicate a gas leak and a high amount of heat that could cause a fire). In some implementations, the control device of the primary vehicle may obtain the event data from the detecting device.

As shown by reference number 104, the control device of the primary vehicle may determine a type of the event. In some implementations, the type of the event may include: a broken window event type (e.g., events concerning a window, a windshield, a sunroof, and/or the like of the primary vehicle breaking and/or the like); an unauthorized entry event type (e.g., events concerning a forceful opening of a door, a trunk, a glovebox, and/or the like of the primary vehicle, an unauthorized unlocking of the primary vehicle, and/or the like); a physical damage event type (e.g., events concerning a different vehicle hitting the primary vehicle, a person hitting the primary vehicle with a bat, hail damaging the primary vehicle, a tree limb falling on the primary vehicle, and/or the like), a vandalism event type (e.g., events concerning keying the primary vehicle, spray painting the primary vehicle, egging the primary vehicle, and/or the like); a personal harm event type (e.g., events concerning a human being injured, assaulted, battered, and/or the like); an unimportant event type (e.g., events concerning thunder, lightning, fireworks, loud music, pedestrians walking near the primary vehicle, acorns falling on the primary vehicle, a dog barking near the primary vehicle, and/or the like); and/or the like.

In some implementations, the control device of the primary vehicle may process the event data using a machine learning model to determine the type of the event. In some implementations, the control device of the primary vehicle may process the event data using an event classification algorithm to determine the type of the event. In some implementations, the event classification algorithm may be a machine learning algorithm. In some implementations, the control device of the primary vehicle, or another device, such as the server device and/or the client device, may generate, train, retrain, update, and/or the like the event classification algorithm using a machine learning technique.

For example, the control device of the primary vehicle may process historical event data to generate and/or train a machine learning model. In some implementations, the control device of the primary vehicle may process the historical event data to train the machine learning model to determine a type of an event.

In some implementations, the control device of the primary vehicle may perform a set of data manipulation procedures to process the historical event data to generate the machine learning model, such as a data preprocessing procedure, a model training procedure, a model verification procedure, and/or the like. For example, the control device of the primary vehicle may preprocess the historical event data to remove irrelevant information, noise, confidential data, and/or the like. In this way, the control device of the primary vehicle may organize thousands, millions, or billions of data entries for machine learning and model generation—a data set that cannot be processed objectively by a human actor.

In some implementations, the control device of the primary vehicle may perform a training operation when generating the machine learning model. For example, the control device of the primary vehicle may portion the historical event data into a training set, a validation set, a test set, and/or the like. In some implementations, the control device of the primary vehicle may perform one or more feature engineering processes. For example, a minimum feature set may be created from pre-processing and/or dimensionality reduction of the historical event data by the control device of the primary vehicle. In some implementations, the control device of the primary vehicle may train the machine learning model on this minimum feature set, thereby reducing processing to train the machine learning model, and may apply a classification technique to the minimum feature set.

In some implementations, the control device of the primary vehicle may use a classification technique, such as a logistic regression classification technique, a random forest classification technique, a gradient boosting (GBM) classification technique, and/or the like to determine a categorical outcome (e.g., that particular historical event data is associated with a particular type of event). Additionally, or alternatively, the control device of the primary vehicle may use a naïve Bayesian classifier technique. In this case, the control device of the primary vehicle may perform binary recursive partitioning to split the data of the minimum feature set into partitions and/or branches, and use the partitions and/or branches to perform predictions (e.g., that particular historical event data is associated with a particular type of event). Based on using recursive partitioning, the control device of the primary vehicle may reduce utilization of computing resources relative to manual, linear sorting and analysis of data points, thereby enabling use of thousands, millions, or billions of data points to train the machine learning model, which may result in a more accurate machine learning model than using fewer data points.

Additionally, or alternatively, the control device of the primary vehicle may use a support vector machine (SVM) classification technique to generate a non-linear boundary between data points in the training set. In this case, the non-linear boundary is used to classify test data (e.g., particular historical event data) into a particular class (e.g., a class indicating that the particular historical event data is associated with a particular type of event).

Additionally, or alternatively, where the test data includes image data, video data, and/or the like, the control device of the primary vehicle may use a computer vision technique, such as a convolutional neural network technique to assist in classifying test data (e.g., particular historical event data) into a particular class (e.g., a class indicating that the particular historical event data is associated with a particular type of event). In some cases, the computer vision technique may include using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), an objection motion technique (e.g., an optical flow framework and/or the like), and/or the like.

Additionally, or alternatively, the control device of the primary vehicle may train the machine learning model using a supervised training procedure that includes receiving input to the model from a subject matter expert or a user, which may reduce an amount of time, an amount of processing resources, and/or the like to train the machine learning model relative to an unsupervised training procedure. In some implementations, the control device of the primary vehicle may use one or more other model training techniques, such as a neural network technique, a latent semantic indexing technique, and/or the like. For example, the control device of the primary vehicle may perform an artificial neural network processing technique (e.g., using a two-layer feedforward neural network architecture, a three-layer feedforward neural network architecture, and/or the like) to perform pattern recognition with regard to patterns of particular historical event data that is associated with a particular type of event. In this case, using the artificial neural network processing technique may improve an accuracy of the machine learning model generated by the control device of the primary vehicle by being more robust to noisy, imprecise, or incomplete data, and by enabling the control device of the primary vehicle to detect patterns and/or trends undetectable to human analysts or systems using less complex techniques.

Accordingly, the control device of the primary vehicle, or another device, such as the server device and/or the client device, may use any number of artificial intelligence techniques, machine learning techniques, deep learning techniques, and/or the like to determine a type of an event.

As shown by reference number 106, the camera device of the primary vehicle may obtain video data concerning the event. In some implementations, the control device of the primary vehicle, based on the type of the event, may control the camera device to obtain the video data. For example, the control device of the primary vehicle may control the camera device to obtain the video data if the type of the event is an unauthorized entry event type. In some implementations, the control device of the primary vehicle, based on the type of event and/or the event data, may cause the one or more cameras of the camera device to move (e.g., pivot on a pivot point) and/or adjust focus to obtain video data concerning the event. For example, the control device of the primary vehicle may cause the one or more cameras of the camera device to point in the direction in which the detecting device detected the event and/or adjust focus to clearly capture video data concerning the event. In some implementations, the control device of the primary vehicle, based on the type of event and/or the event data, may cause the one or more cameras of the camera device to obtain video data concerning a particular area around the primary vehicle, such as an area in front, in back, to the side, and/or the like of the primary vehicle, a 360 degree area around the primary vehicle, and/or the like. In some implementations, the control device of the primary vehicle may obtain the video data from the camera device.

In some implementations, the control device of the primary vehicle may determine a start time of the event. For example, the control device of the primary vehicle may determine the start time of the event based on a time the detecting device detected the event and/or obtained the event data. In some implementations, the control device of the primary vehicle may obtain video data from the memory of the camera device relating to a first interval of time before the start time of the event. For example, where the memory is a circular buffer and the camera device is continuously obtaining video data and continuously storing the video data in the memory (e.g., such that the memory stores video data relating to a particular interval, such as 30 seconds of the most recent video data) and overwriting video data (e.g., such that the memory deletes video data not relating to the particular interval, such as video data older than 30 seconds), the control device may obtain the video data from the memory relating to the particular interval before the start time of the event. In some implementations, the control device of the primary vehicle may obtain video data from the camera device relating to a second interval of time after the start time of the event. For example, the control device of the primary vehicle may obtain video data from the camera device for the duration of the time the detecting device detects the event and/or obtains event data as well an additional period of time (e.g., 5 seconds after the detecting device stops detecting the event and/or obtaining the event data). In some implementations, the control device of the primary vehicle may join the video data relating to the first interval of time and the video data relating to the second interval of time to obtain the video data concerning the event.

In some implementations, the control device of the primary vehicle, based on the type of the event, may control the camera device to not obtain video data. For example, the control device of the primary vehicle may control the camera device to not obtain the video data if the type of the event is an unimportant event type. In this way, the control device of the primary device may conserve resources of the control device of the primary vehicle and/or the camera device that would otherwise be used to obtain video data concerning an irrelevant event.

As shown by reference number 108, the location device of the primary vehicle may obtain location data. In some implementations, the location data may concern a location of the primary vehicle. In some implementations, the control device of the primary vehicle, based on the type of the event, may control the location device to obtain the location data. For example, the control device of the primary vehicle may control the location device to obtain the location data if the type of the event is a personal harm event type so that location information can be sent to emergency responders. In some implementations, the control device of the primary vehicle may obtain the location data from the location device.

As shown by reference number 110, the control device of the primary vehicle may send the event data, the type of the event, the video data, and/or the location data to the server device. For example, the control device of the primary vehicle may send the event data, the type of the event, the video data, and/or the location data to the server device via the cellular connection, the wireless connection, and/or the like. In some implementations, the server device may obtain the event data, the type of the event, the video data, and/or the location data from the control device of the primary vehicle.

In some implementations, instead of the control device of the primary vehicle determining the type of the event, the server device may determine the type of the event. For example, the server device may process the event data, the video data, and/or the location data to determine a type of the event in a similar manner as described herein in relation to FIG. 1A and reference number 104. For example, the server device may process the event data using an event classification algorithm that uses a machine learning algorithm.

As shown in FIG. 1B and reference number 112, the control device of the primary vehicle may notify the one or more additional vehicles about the event. In some implementations, the control device of the primary vehicle may notify the one or more additional vehicles about the event after the control device of the primary vehicle obtains the event data, the video data, and/or the location data. In some implementations, the control device of the primary vehicle may notify the one or more additional vehicles about the event after the control device of the primary detects the event, even if the control device of the primary vehicle does not obtain the event data, the video data, and/or the location data (e.g., because the primary vehicle does not have a camera device, a location device, and/or the like).

In some implementations, the control device of the primary vehicle may send a message to a control device of an additional vehicle. In some implementations, the message may include information about the event and/or the event type. In some implementations, the message may include a request for the control device of the additional vehicle to obtain additional event data concerning the event, additional video data concerning the event, and/or additional location data concerning a location of the additional vehicle. In some implementations, the message may include a request for the control device of the additional vehicle to send the additional event data, the additional video data, and/or the additional location data to the server device and/or the control device of the primary vehicle. In some implementations, the control device of the primary vehicle may send the message to the control device of the additional vehicle via the cellular connection, the wireless connection, and/or the like. For example, the control device of the primary vehicle and the control device of the additional vehicle may be part of a mesh network and the control device of the primary vehicle may directly send the message to the control device of the additional vehicle via the mesh network. Some example implementations described herein concern the control device of the primary vehicle sending the message to a control device of a single additional vehicle, but implementations may include the control device of the primary vehicle sending the message to a respective control device of at least one additional vehicle of the one or more additional vehicles. Moreover, implementations may include the server device sending the message to the respective control device of the at least one additional vehicle of the plurality of additional vehicles.

In some implementations, the control device of the primary vehicle may determine a proximity zone around the primary vehicle to determine whether the control device of the primary vehicle should send the message to a control device of an additional vehicle. For example, the control device of the primary vehicle may send the message to a control device of an additional vehicle based on determining that the additional vehicle is within the proximity zone. As another example, the control device of the primary vehicle may send the message to a control device of an additional vehicle within the proximity zone, but may refrain from sending the message to a control device of an additional vehicle outside of the proximity zone. In this way, the control device of the primary vehicle may conserve control device, detecting device, camera device, and/or location device resources of additional vehicles that are outside of the proximity zone and unlikely to obtain event data, video data, and/or location data that concerns the event.

In some implementations, the proximity zone may be a geographic area around the primary vehicle, such as a radius around the primary vehicle (e.g., a 100 foot radius around the primary vehicle, a half mile radius around the primary vehicle, and/or the like), a wireless communication range of the control device of the primary vehicle (e.g., a range of a Bluetooth® connection of the control device of the primary vehicle), and/or the like. In some implementations, the control device of the primary vehicle may determine the proximity zone based on the type of the event and/or the location data. For example, the control device of the primary vehicle may determine the proximity zone to be large (e.g., a 1 mile radius) based on a physical damage event type (e.g., an event associated with a hit-and-run accident by a different vehicle where obtaining video data of the different vehicle driving away from the primary vehicle may be desirable) and may determine the proximity zone to be small (e.g., a 50 foot radius) based on an unauthorized entry event type (e.g., an event associated with a break-in of the primary vehicle). As another example, the control device of the primary vehicle may determine the proximity zone to be large based on the location of the primary vehicle being in a rural area (e.g., a lower probability that additional vehicles are near the primary vehicle) and may determine the proximity zone to be small based on the location of the primary vehicle being in an urban area (e.g., a higher probability that additional vehicles are near the primary vehicle).

In some implementations, the server device may determine the proximity zone around the primary vehicle in a similar manner as the control device of the primary vehicle described herein. In some implementations, the control device of the primary vehicle may send a message to the server device and/or a control device of an additional vehicle that indicates the proximity zone. In some implementations, the message may indicate the location of the primary vehicle and the proximity zone of the primary vehicle. Some example implementations described herein concern the control device of the primary vehicle and/or the server device sending the message that indicates the location of the primary vehicle and/or the proximity zone to a control device of a single additional vehicle, but implementations may include the control device of the primary vehicle and/or the server device sending the message to a respective control device of at least one additional vehicle of the one or more additional vehicles. Further, in some implementations, a control device of a particular additional vehicle of the one or more additional vehicles may send the message to a respective control device of at least one additional vehicle of the one or more additional vehicles that is not the particular additional vehicle. For example, where the control device of the particular additional vehicle and the control device of the at least one additional vehicle are part of a mesh network, the control device of the particular additional vehicle may directly send the message to the control device of the at least one additional vehicle via the mesh network.

In some implementations, the control device of the primary vehicle may determine that an additional vehicle and/or a control device of the additional vehicle is in the proximity zone. For example, the control device of the primary vehicle may send a query to a control device of an additional vehicle regarding a location of the additional vehicle. In some implementations, the control device of the primary vehicle may send the query to the control device of the additional vehicle via the cellular connection, the non-cellular connection, and/or the like. For example, the control device of the primary vehicle may send the query to a control device of an additional vehicle that is within a wireless communication range of the control device of the primary vehicle. In some implementations, the control device of the primary vehicle may receive a response from the control device of the additional vehicle that indicates a location of the additional vehicle. In some implementations, the response may include additional location data of the additional vehicle that concerns the location of the additional vehicle. In some implementations, the control device of the primary vehicle may determine that the additional vehicle is within the proximity zone based on the response. For example, the control device of the primary vehicle may compare the location data and the additional location data to determine that the additional vehicle and/or the control device of the additional vehicle is within the proximity zone. As another example, the control device of the primary vehicle may determine, based on the location data and the additional location data, a distance between the location of the primary vehicle and the location of the additional vehicle and may determine that the distance satisfies a threshold associated with the proximity zone to determine that the additional vehicle and/or the control device of the additional vehicle is within the proximity zone.

In some implementations, the server device and/or the control device of the additional vehicle may determine that the additional vehicle and/or the control device of the additional vehicle is in the proximity zone around the primary vehicle in a similar manner as the control device of the primary vehicle described herein. For example, the server device and/or the control device of the additional vehicle may determine that the additional vehicle and/or the control device of the additional vehicle is in the proximity zone around the primary vehicle based on the message that indicates the location of the primary vehicle and the proximity zone of the primary vehicle.

As shown by reference number 114, a control device of an additional vehicle may obtain the additional event, the additional video data, and/or the additional location data in a similar manner as described herein in relation to FIG. 1A. For example, a control device of an additional vehicle may control a detecting device of the additional vehicle to obtain additional event data, a camera device of the additional vehicle to obtain additional video data, a location device of the additional vehicle to obtain additional location data, and/or the like. Some example implementations described herein concern a control device of a single additional vehicle obtaining additional event data, additional video data, and/or additional location data, but implementations may include a respective control device of at least one additional vehicle of the one or more additional vehicles obtaining the additional event data, additional video data, and/or additional location data.

In some implementations, a control device of an additional vehicle may cause, based on determining that the location of the additional vehicle is within the proximity zone of the primary vehicle, a camera device of the additional vehicle to capture the additional video data. For example, the control device of the additional vehicle may cause one or more cameras of the camera device to point in the direction of and/or focus on the primary vehicle to obtain the additional video data. In some implementations, the control device of the additional vehicle may send, to the control device of the primary vehicle, a message that indicates that the location of the additional vehicle is within the proximity zone. In response, in some implementations, the control device of the primary vehicle may send a message that indicates the type of the event and an interval of time, such as a period of time in which the event occurred. In some implementations, the control device of the additional vehicle may receive the message that indicates the type of the event and the interval of time and, based on the interval of time, obtain the additional video data during the interval of time from the camera device associated with the additional vehicle.

As shown by reference number 116, the respective control device of at least one of the one or more additional vehicles may send the additional event data, the additional video data, and/or the additional location data to the server device in a similar manner as described herein in relation to FIG. 1A and reference number 110. In some implementations, the respective control device of at least one of the one or more additional vehicles may send the additional event data, the additional video data, and/or the additional location data to the control device of the primary vehicle. For example, where the control device of the primary vehicle and the control device of the additional vehicle are part of a mesh network, the control device of the additional vehicle may directly send the additional event data, the additional video data, and/or the additional location data to the control device of the primary vehicle via the mesh network. In some implementations, the server device and/or the control device of the primary vehicle may obtain the additional event data, the additional video data, and/or the additional location data from the respective control device of the at least one of the one or more additional vehicles. In some implementations, the control device of the at least one additional vehicle may send a message to the control device of the primary vehicle that indicates that the additional video data has been sent to the server device.

As shown in FIG. 1C and by reference number 118, the server device may process the event data, the type of the event, the video data, the location data, the additional event data, the additional video data, and/or the additional location data. In some implementations, receiving the event data, the type of the event, the video data, the location data, the additional event data, the additional video data, and/or the additional location data may cause the server device to process the received data. In some implementations, the server device may process the received data to determine and/or identify relevant event information.

In some implementations, the relevant information may include an identification of: one or more persons; one or more characteristics of the one or more persons (e.g., an approximate height, an approximate weight, a skin color, a hair color, a color of the one or more person's clothing, and/or the like); one or more objects; a location of the one or more persons and/or one or more objects; an orientation of the one or more persons, the one or more objects, the primary vehicle, and/or the one or more additional vehicles to each other; one or more actions of the one or more persons or the one or more objects in relation to the event, the type of the event, the primary vehicle, the one or more additional vehicles, and/or the like; and/or the like. For example, the server device may process the video data and/or the additional video data to identify one or more objects using an object detection algorithm, such as a convolutional neural network algorithm. The server device may further process the video data and/or the additional video data to determine motion of the one or more objects using a motion detection algorithm, such as an optical flow algorithm, a long short term memory algorithm, a recurrent neural net algorithm, and/or the like, and determine that the motion of the one or more objects caused the event. In some implementations, the relevant information may include the video data and/or the additional video data (e.g., the relevant information may include one or more video files that include the video data and/or the additional video data). In some implementations, the relevant event information may include a portion of the video data and/or a portion of the additional video data (e.g., the relevant information may be a video file that includes the video data and the additional video data for only the duration of the event).

In some implementations (e.g., where the control device of an additional vehicle directly sends (e.g., via a mesh network) the additional event data, the additional video data, and/or the additional location data to the control device of the primary vehicle), the control device of the primary vehicle may process the event data, the type of the event, the video data, the location data, the additional event data, the additional video data, and/or the additional location data to determine and/or identify the relevant event information in a similar manner as the server device described herein.

As shown by reference number 120, the server device may send the relevant event information to the control device of the primary vehicle and/or a client device. In some implementations, the control device of the primary vehicle may obtain the relevant event information from the server device. In some implementations, the client device may obtain the relevant event information from the server device and/or from the control device of the primary vehicle. In some implementations, the control device of the primary device and/or the client device may store the relevant event information in memory for later retrieval.

As shown by reference number 122, the control device of the primary vehicle and/or the client device may cause display of the relevant event information. For example, the client device may display the relevant event information on a display of the client device and/or the control device of the primary vehicle may display the relevant event information on a display of the primary vehicle. In some implementations, the control device of the primary vehicle, the server device, and/or the client device may store and/or cause storage of the relevant event information in a data structure before causing display of the relevant event information.

In some implementations, where the relevant event information includes the portion of the video data and the portion of the additional video data, the control device of the primary vehicle, the server device, and/or the client device may determine a correspondence between the portion of the video data and the portion of the additional video data and synchronize the portion of the video data and the portion of the additional video data. For example, the portion of the video data and the portion of the additional video data may cover different, overlapping time periods and the control device of the primary vehicle, the server device, and/or the client device may determine an interval of time common to the different, overlapping time periods. The control device of the primary vehicle, the server device, and/or the client device may cause concurrent display of the portion of the video data and the portion of the additional video data such that the portion of the video data and the portion of the additional video data are displayed at the same time for the interval of time (e.g., via a split screen presentation that shows the portion of the video data and the portion of the additional video data at the same time for the interval of time).

As shown by reference number 124, the server device, the control device of the primary vehicle, and/or the client device may perform, based on the relevant event information, an action concerning the event. For example, the server device, the control device of the primary vehicle, and/or the client device may initiate a phone call to an emergency services provider and provide the relevant event information to the emergency services provider. As another example, the server device may generate an event report, such as a police report, an insurance claim report, a vehicle inspection report, and/or the like based on the relevant event information and send the event report to the client device, the control device of the primary vehicle, a device associated with law enforcement, and/or a device associated with an insurance company. In a further example, the control device of the primary vehicle may cause an alarm to go off on the primary vehicle or an indicator light to turn on to indicate that the event has been detected and the relevant event information is available. As another example, the client device may cause an alert to be displayed indicating that the event has been detected and the relevant event information is available.

Some example implementations described herein concern a control device of a primary vehicle sharing data with respective control devices of one or more additional vehicles via a server device, but implementations may include the control device of the primary vehicle directly communicating with the respective control devices of one or more additional vehicles to share the data. For example, the control device of the primary vehicle and the respective control devices of the one or more additional vehicles may be part of a mesh network, and the control device of the primary vehicle may directly communicate with the respective control devices of the one or more additional vehicles to send and/or receive the data. In such implementations, a server device is not needed to facilitate obtaining the data, processing the data, determining relevant event information, performing an action based on the relevant event information, and/or the like.

Some example implementations described herein concern one or more control devices, detecting devices, camera devices, and/or location devices associated with one or more vehicles, but implementations may include one or more control devices, detecting devices, camera devices, and/or location devices not associated with one or more vehicles. For example, implementations may include a security camera (e.g., mounted on a pole or building), one or more additional security cameras, a server device, and/or a client device for detecting an event and automatically obtaining video data in a similar manner as described herein in relation to FIGS. 1A-1C.

As indicated above, FIGS. 1A-1C are provided merely as an example. Other examples may differ from what was described with regard to FIGS. 1A-1C.

Figure 2:
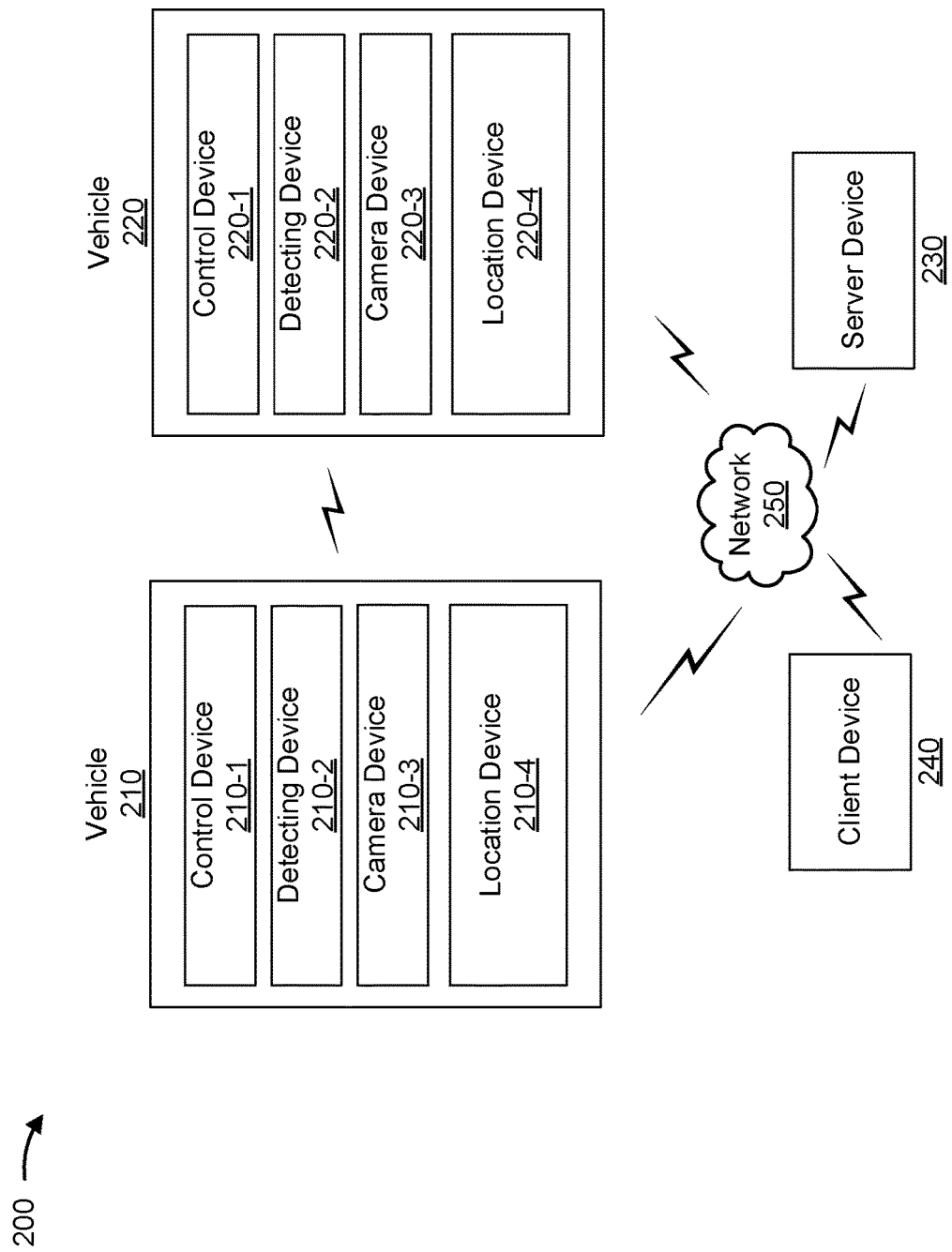
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a vehicle 210 (e.g., including a control device 210-1, a detecting device 210-2, a camera device 210-3, and/or a location device 210-4), a vehicle 220 (e.g., including a control device 220-1, a detecting device 220-2, a camera device 220-3, and/or a location device 220-4), a server device 230, a client device 240, and a network 250. Devices of environment 200 may interconnect via wired connections, wireless connections, or a combination of wired and wireless connections.

Vehicle 210 includes one or more devices (e.g., control device 210-1, detecting device 210-2, camera device 210-3, location device 210-4, and/or the like) capable of detecting an event and automatically obtaining video data. Control device 210-1 includes a communication and/or computing device, such as a wireless communication device, a cellular communication device, an electronics control unit (ECU), a mobile phone (e.g., a smart phone, a radiotelephone, etc.), a laptop computer, a tablet computer, a handheld computer and/or a similar device that is capable of: controlling detecting device 210-2, camera device 210-3, location device 210-4, and/or the like; obtaining event data, video data, location data, and/or the like; determining a type of an event; communicating with vehicle 220 (e.g., via control device 220-1), server device 230, and client device 240; obtaining relevant event information; causing display of the relevant information; performing an action based on the relevant event information; and/or the like.

Detecting device 210-2 includes one or more devices, such as a microelectromechanical systems (MEMS) device, capable of detecting an event and/or obtaining event data. For example, detecting device 210-2 may include a microphone (e.g., that obtains audio data), a sound level meter (e.g., that obtains sound level data), a motion detector (e.g., that obtains motion data), a heat detector (e.g., that obtains heat data), a smoke detector (e.g., that obtains smoke data), a shock or vibration sensor (e.g., that obtains shock or vibration data), a contact sensor (e.g., that obtains contact data), a chemical sensor (e.g., that obtains chemical data), and/or the like. In some implementations, detecting device 210-2 may detect that an event has occurred and/or obtain event data concerning the event. In some implementations, the detecting device may be mounted on, integrated into, and/or affixed to vehicle 210 (e.g., on a dashboard of vehicle 210, on a windshield of vehicle 210, in a bumper of vehicle 210, in a door handle of vehicle 210, and/or the like). In some implementations, detecting device 210-2 may use or be part of another device of vehicle 210, such as a radar device, a camera device, a light detection and ranging (Lidar) device, and/or the like of vehicle 210. In some implementations, detecting device 210-2 may be controlled by and/or may communicate with control device 210-1.

Camera device 210-3 includes one or more devices capable of obtaining video data (e.g., concerning an event). For example, camera device 210-3 may include one or more cameras (e.g., one or more of a dashboard camera, a video camera, a backup camera, a rearview camera, a lane monitoring camera, a blind spot camera, and/or the like). In some implementations, camera device 210-3 may include a memory, and may obtain the video data and store the video data in the memory as the camera device obtains the video data. In some implementations, camera device 210-3 may obtain video data from a front of vehicle 210, a back of vehicle 210, a side of vehicle 210, and/or the like. In some implementations, the one or more cameras of camera device 210-3 may be controlled to move (e.g., pivot on a pivot point) and/or adjust focus to obtain video data concerning a subject and/or area. In some implementations, camera device 210-3 may obtain video data concerning an area around vehicle 210, such as a field of view of a camera of the one or more cameras of the camera device, a 360 degree area view around vehicle 210, and/or the like. In some implementations, camera device 210-3 may be mounted on, integrated into, and/or affixed to vehicle 210 (e.g., on a dashboard of vehicle 210, on a windshield of vehicle 210, in a bumper of vehicle 210, in a side mirror of vehicle 210, and/or the like). In some implementations, camera device 210-3 may be controlled by and/or may communicate with control device 210-1.

Location device 210-4 includes one or more devices capable of obtaining location data (e.g., concerning a location of vehicle 210). In some implementations, location device 210-4 may include one or more devices that detect a location of vehicle 210, such as a global positioning system (GPS) device. In some implementations, the location data may include the location of vehicle 210 (e.g., represented as a latitude and longitude pair), a time of the location of vehicle 210 (e.g., when vehicle 210 is at the location), a heading of vehicle 210 (e.g., which way vehicle 210 is pointing, such as in degrees away from north, where north is represented by 0 degrees), a distance from a last recorded location of vehicle 210, and/or the like. In some implementations, location device 210-4 may be mounted on, integrated into, and/or affixed to vehicle 210 (e.g., on a dashboard of vehicle 210, on a windshield of vehicle 210, in a bumper of vehicle 210, in a head unit of vehicle 210, and/or the like). In some implementations, location device 210-4 may be controlled and/or may communicate with control device 210-1.

Vehicle 220 includes similar devices to those of vehicle 210. Vehicle 220 includes one or more devices (e.g., control device 220-1, detecting device 220-2, camera device 220-3, location device 220-4, and/or the like) capable of detecting an event and automatically obtaining video data. Control device 220-1 includes a communication and/or computing device, such as a wireless communication device, a cellular communication device, an ECU, a mobile phone (e.g., a smart phone, a radiotelephone, etc.), a laptop computer, a tablet computer, a handheld computer and/or a similar device that is capable of: controlling detecting device 220-2, camera device 220-3, location device 220-4, and/or the like; obtaining additional event data, additional video data, additional location data, and/or the like; determining a type of an event; communicating with vehicle 210 (e.g., via control device 210-1), server device 230, and client device 240; obtaining relevant event information; causing display of the relevant information; performing an action based on the relevant event information; and/or the like.

Detecting device 220-2 includes one or more devices, such as a MEMS device, capable of detecting an event and/or obtaining event data. For example, detecting device 220-2 may include a microphone (e.g., that obtains audio data), a sound level meter (e.g., that obtains sound level data), a motion detector (e.g., that obtains motion data), a heat detector (e.g., that obtains heat data), a smoke detector (e.g., that obtains smoke data), a shock or vibration sensor (e.g., that obtains shock or vibration data), a contact sensor (e.g., that obtains contact data), a chemical sensor (e.g., that obtains chemical data), and/or the like. In some implementations, detecting device 220-2 may detect that an event has occurred and/or obtain event data concerning the event. In some implementations, the detecting device may be mounted on, integrated into, and/or affixed to vehicle 220 (e.g., on a dashboard of vehicle 220, on a windshield of vehicle 220, in a bumper of vehicle 220, in a door handle of vehicle 220, and/or the like). In some implementations, detecting device 220-2 may use or be part of another device of vehicle 220, such as a radar device, a camera device, a light detection and ranging (Lidar) device, and/or the like of vehicle 220. In some implementations, detecting device 220-2 may be controlled by and/or may communicate with control device 220-1.

Camera device 220-3 includes one or more devices capable of obtaining video data (e.g., concerning an event). For example, camera device 220-3 may include one or more cameras (e.g., one or more of a dashboard camera, a video camera, a backup camera, a rearview camera, a lane monitoring camera, a blind spot camera, and/or the like). In some implementations, camera device 220-3 may include a memory, and may continuously obtain the video data and continuously store the video data in the memory as the camera device obtains the video data. In some implementations, camera device 220-3 may obtain video data from a front of vehicle 220, a back of vehicle 220, a side of vehicle 220, and/or the like. In some implementations, the one or more cameras of camera device 220-3 may be controlled to move (e.g., pivot on a pivot point) and/or adjust focus to obtain video data concerning a subject and/or area. In some implementations, camera device 220-3 may obtain video data concerning an area around vehicle 220, such as a field of view of a camera of the one or more cameras of the camera device, a 360 degree area view around vehicle 220, and/or the like. In some implementations, camera device 220-3 may be mounted on, integrated into, and/or affixed to vehicle 220 (e.g., on a dashboard of vehicle 220, on a windshield of vehicle 220, in a bumper of vehicle 220, in a side mirror of vehicle 220, and/or the like). In some implementations, camera device 220-3 may be controlled by and/or may communicate with control device 220-1.

Location device 220-4 includes one or more devices capable of obtaining location data (e.g., concerning a location of vehicle 220). In some implementations, location device 220-4 may include one or more sensors that detect a location of vehicle 220, such as a GPS. In some implementations, the location data may include the location of vehicle 220 (e.g., represented as a latitude and longitude pair), a time of the location of vehicle 220 (e.g., when vehicle 220 is at the location), a heading of vehicle 220 (e.g., which way vehicle 220 is pointing, such as in degrees from north, where north is represented by 0 degrees), a distance from a last recorded location of vehicle 220, and/or the like. In some implementations, location device 220-4 may be mounted on, integrated into, and/or affixed to vehicle 220 (e.g., on a dashboard of vehicle 220, on a windshield of vehicle 220, in a bumper of vehicle 220, in a head unit of vehicle 220, and/or the like). In some implementations, location device 220-4 may be controlled and/or may communicate with control device 220-1.

Server device 230 includes one or more devices capable of receiving, generating, storing, processing, and/or providing information associated with detecting an event and automatically obtaining video data. For example, server device 230 may include a server device (e.g., a host server, a web server, an application server, etc.), a data center device, and/or a similar device. In some implementations, server device 230 may receive event data, data describing a type of an event, video data, and/or location data of and/or from vehicle 210. In some implementations, server device 230 may receive event data, video data, and/or location data of and/or from vehicle 220. In some implementations, server device 230 may process the event data, the type of the event, the video data, and/or the location data of vehicle 210 and the event data, the video data, and/or the location data of vehicle 220 to identify and/or determine relevant event information, and may send the relevant information to vehicle 220 and/or client device 240.

Client device 240 includes one or more devices capable of receiving, generating, storing, processing, and/or providing information associated with an event. For example, client device 240 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 240 may display relevant information associated with an event concerning a vehicle.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network (e.g., a Bluetooth® mesh network, a ZigBee mesh network), a low-power, wide-area network (e.g., a narrow band internet of things (NBIoT) network, a Sigfox network, a LoRa network, an LTE-M network, an LTE Cat-M1 network, and/or the like) or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
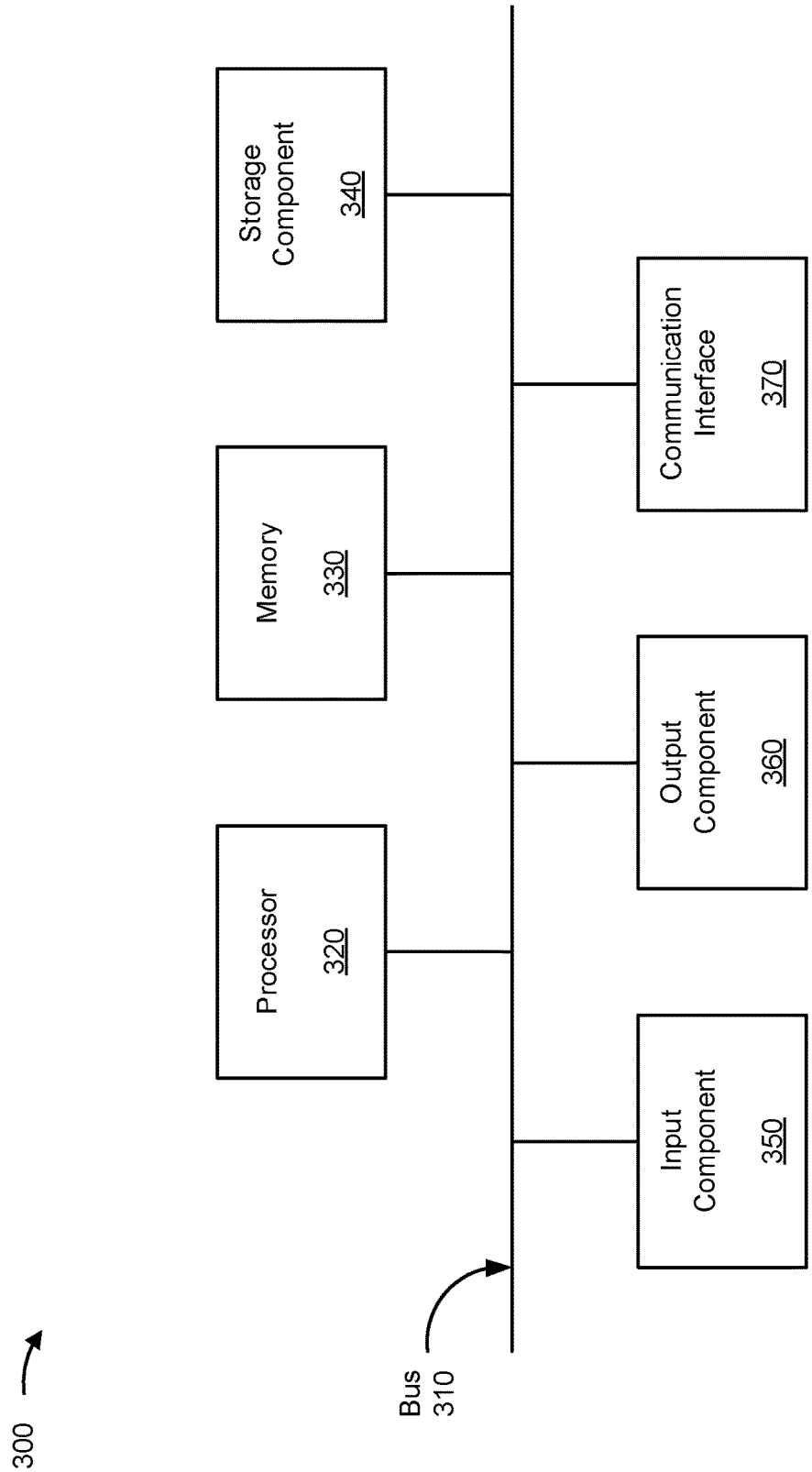
FIG. 3 is a diagram of example components of one or more devices of FIG. 2.

FIG. 3 is a diagram of example components of a device 300. Device 300 may correspond to vehicle 210, control device 210-1, detecting device 210-2, camera device 210-3, location device 210-4, vehicle 220, control device 220-1, detecting device 220-2, camera device 220-3, location device 220-4, server device 230, and/or client device 240. In some implementations, vehicle 210, control device 210-1, detecting device 210-2, camera device 210-3, location device 210-4, vehicle 220, control device 220-1, detecting device 220-2, camera device 220-3, location device 220-4, server device 230, and/or client device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
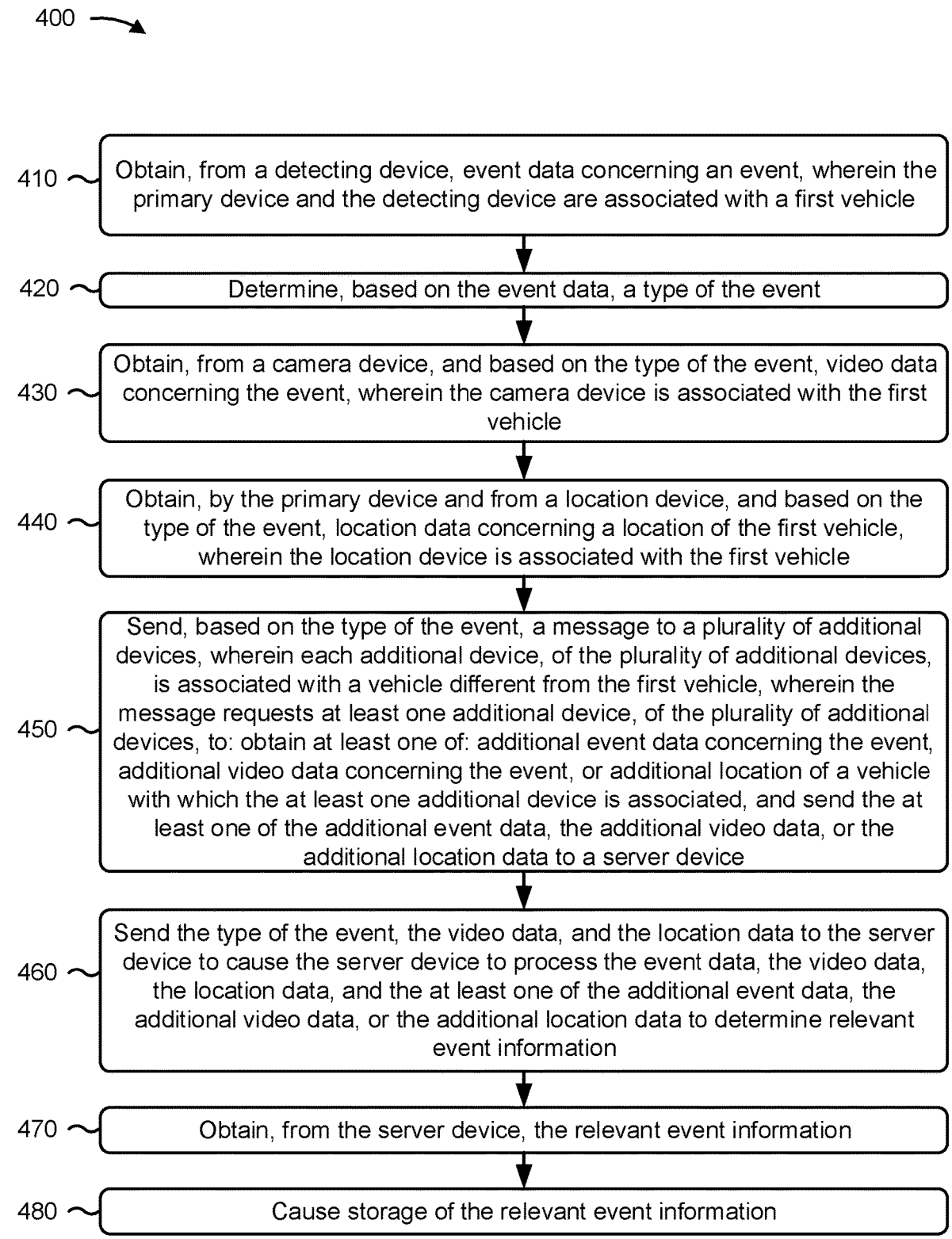
FIGS. 4-6 are flow charts of an example processes for detecting an event and automatically obtaining video data.

FIG. 4 is a flow chart of an example process 400 for detecting an event and automatically obtaining video data. In some implementations, one or more process blocks of FIG. 4 may be performed by a primary device such as a control device (e.g., control device 210-1). In some implementations, one or more process blocks of FIG. 4 may be performed by another device or a group of devices separate from or including the control device, such as vehicle 210, detecting device 210-2, camera device 210-3, location device 210-4, vehicle 220, control device 220-1, detecting device 220-2, camera device 220-3, location device 220-4, server device 230, and/or client device 240.

As shown in FIG. 4, process 400 may include obtaining, from a detecting device, event data concerning an event, wherein the primary device and the detecting device are associated with a first vehicle (block 410). For example, the control device (e.g., using processor 320, memory 330, storage component 340, input component 350, communication interface 370, and/or the like) may obtain, from a detecting device, event data concerning an event, as described above in connection with FIGS. 1A-1C. In some implementations, the primary device and the detecting device may be associated with a first vehicle.

As further shown in FIG. 4, process 400 may include determining, based on the event data, a type of the event (block 420). For example, the control device (e.g., using processor 320, memory 330, storage component 340, and/or the like) may determine, based on the event data, a type of the event, as described above in connection with FIGS. 1A-1C.

As further shown in FIG. 4, process 400 may include obtaining, from a camera device, and based on the type of the event, video data concerning the event, wherein the camera device is associated with the first vehicle (block 430). For example, the control device (e.g., using processor 320, memory 330, storage component 340, input component 350, communication interface 370, and/or the like) may obtain, from a camera device, and based on the type of the event, video data concerning the event, as described above in connection with FIGS. 1A-1C. In some implementations, the camera device may be associated with the first vehicle.

As further shown in FIG. 4, process 400 may include obtaining, from a location device, and based on the type of the event, location data concerning a location of the first vehicle, wherein the location device is associated with the first vehicle (block 440). For example, the control device (e.g., using processor 320, memory 330, storage component 340, input component 350, communication interface 370, and/or the like) may obtain, from a location device, and based on the type of the event, location data concerning a location of the first vehicle, as described above in connection with FIGS. 1A-1C. In some implementations, the location device may be associated with the first vehicle.

As further shown in FIG. 4, process 400 may include sending, based on the type of the event, a message to a plurality of additional devices, wherein each additional device, of the plurality of additional devices, is associated with a vehicle different from the first vehicle, and wherein the message requests at least one additional device, of the plurality of additional devices, to obtain at least one of additional event data concerning the event, additional video data concerning the event, or additional location data concerning a location of a vehicle with which the at least one additional device is associated, and to send the at least one of the additional event data, the additional video data, or the additional location data to a server device (block 450). For example, the control device (e.g., using processor 320, memory 330, storage component 340, communication interface 370, and/or the like) may send, based on the type of the event, a message to a plurality of additional devices, as described above in connection with FIGS. 1A-1C. In some implementations, each additional device, of the plurality of additional devices, may be associated with a vehicle different from the first vehicle, and the message may request at least one additional device, of the plurality of additional devices, to obtain at least one of additional event data concerning the event, additional video data concerning the event, or additional location data concerning a location of a vehicle with which the at least one additional device is associated, and to send the at least one of the additional event data, the additional video data, or the additional location data to a server device.

As further shown in FIG. 4, process 400 may include sending the type of the event, the video data, and the location data to the server device in order to cause the server device to process the event data, the video data, the location data, and the at least one of the additional event data, the additional video data, or the additional location data to determine relevant event information (block 460). For example, the control device (e.g., using processor 320, memory 330, storage component 340, communication interface 370, and/or the like) may send the type of the event, the video data, and the location data to the server device to cause the server device to process the event data, the video data, the location data, and the at least one of the additional event data, the additional video data, or the additional location data to determine relevant event information, as described above in connection with FIGS. 1A-1C.

As further shown in FIG. 4, process 400 may include obtaining, from the server device, the relevant event information (block 470). For example, the control device (e.g., using processor 320, memory 330, storage component 340, communication interface 370, and/or the like) may obtain, from the server device, the relevant event information, as described above in connection with FIGS. 1A-1C.

As further shown in FIG. 4, process 400 may include causing storage of the relevant event information (block 480). For example, the control device (e.g., using processor 320, memory 330, storage component 340, output component 360, communication interface 370, and/or the like) may cause storage of the relevant event information, as described above in connection with FIGS. 1A-1C.

Process 400 may include additional implementations, including any single implementation or any combination of implementations described below and/or in connection with one or more other processes described elsewhere herein.

In some implementations, the detecting device may be a microphone and the event data may include audio data concerning the event. In some implementations, the detecting device may include a sound level meter and the event data may include sound level data concerning the event. In some implementations, the type of the event may include a broken window event type, an unauthorized entry event type, a physical damage event type, a vandalism event type, or a personal harm event type. In some implementations, when determining the type of the event, the control device may process the event data using a machine learning model to determine the type of the event.

In some implementations, when obtaining the video data concerning the event from the camera device, the control device may determine, based on the event data, a start time of the event, may collect the video data from the camera device relating to a first interval of time before the start time of the event, may collect the video data from the camera device relating to a second interval of time after the start time of the event, and may join the video data relating to the first interval of time and the video data relating to the second interval of time.

In some implementations, when sending the message to the plurality of additional devices, the control device may determine, based on the type of the event and the location data, a proximity zone around the first vehicle, may send a location query to a set of additional devices within a wireless communication range of the primary device, may receive, from a particular additional device of the set of additional devices, a location of the vehicle different from the first vehicle associated with the particular additional device, may determine that the vehicle different from the first vehicle associated with the particular additional device is within the proximity zone, and may send the message to the particular additional device.

In some implementations, the relevant event information may include a portion of the video data and a portion of the additional video data. In some implementations, the control device may determine a correspondence between the portion of the video data and the portion of the additional video data, may synchronize, based on the correspondence, the portion of the video data and the portion of the additional video data, and may cause concurrent display, based on synchronizing the portion of the video data and the portion of the additional video data, of the portion of the video data and the portion of the additional video data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
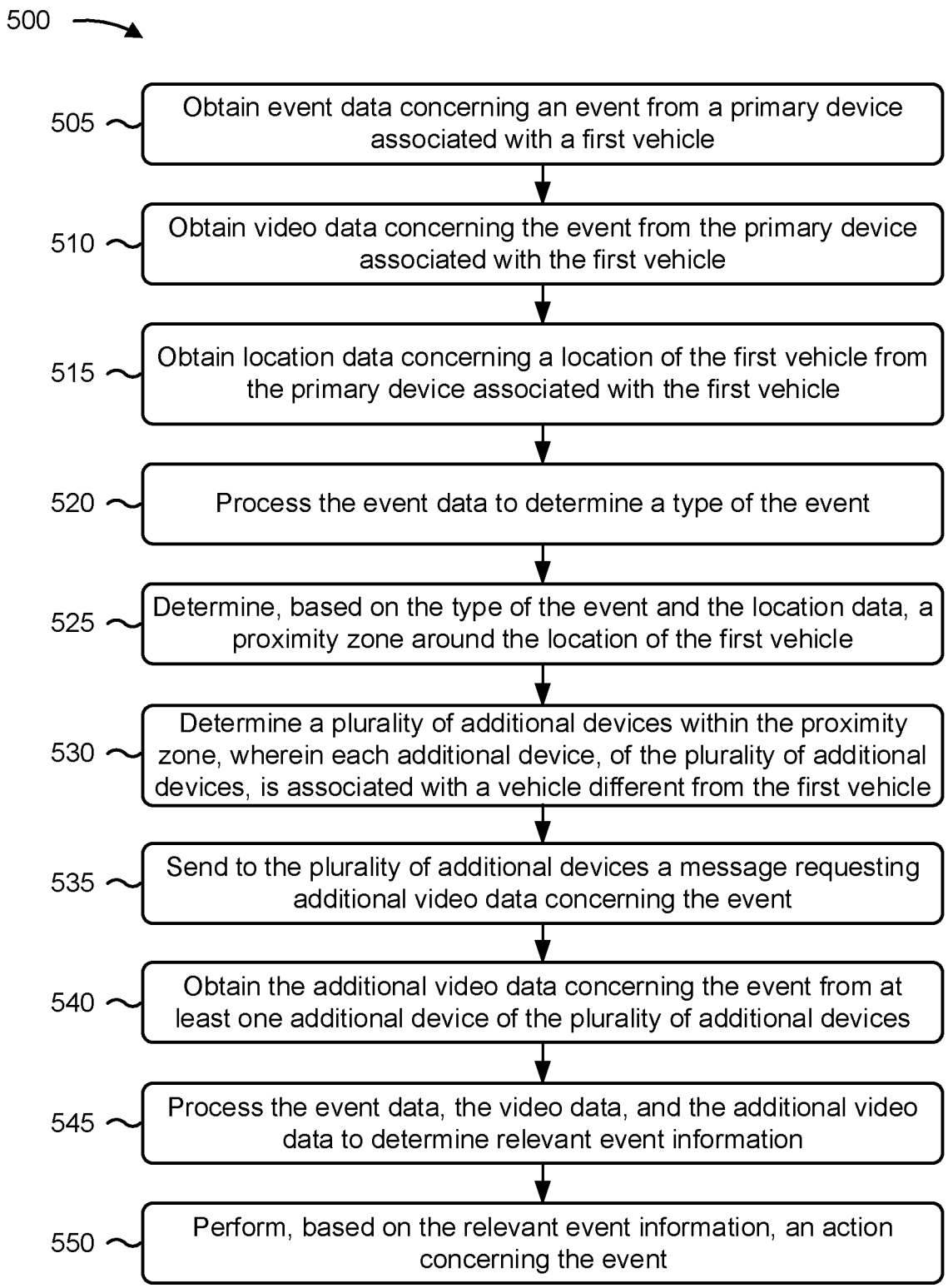

FIG. 5 is a flow chart of an example process 500 for detecting an event and automatically obtaining video data. In some implementations, one or more process blocks of FIG. 5 may be performed by a server device (e.g., server device 230). In some implementations, one or more process blocks of FIG. 5 may be performed by another device or a group of devices separate from or including the server device, such as vehicle 210, control device 210-1, detecting device 210-2, camera device 210-3, location device 210-4, vehicle 220, control device 220-1, detecting device 220-2, camera device 220-3, location device 220-4, and/or client device 240.

As shown in FIG. 5, process 500 may include obtaining event data concerning an event from a primary device associated with a first vehicle (block 505). For example, the server device (e.g., using processor 320, memory 330, storage component 340, input component 350, communication interface 370, and/or the like) may obtain event data concerning an event from a primary device associated with a first vehicle, as described above in connection with FIGS. 1A-1C.

As further shown in FIG. 5, process 500 may include obtaining video data concerning the event from the primary device associated with the first vehicle (block 510). For example, the server device (e.g., using processor 320, memory 330, storage component 340, input component 350, communication interface 370, and/or the like) may obtain video data concerning the event from the primary device associated with the first vehicle, as described above in connection with FIGS. 1A-1C.

As further shown in FIG. 5, process 500 may include obtaining location data concerning a location of the first vehicle from the primary device associated with the first vehicle (block 515). For example, the server device (e.g., using processor 320, memory 330, storage component 340, input component 350, communication interface 370, and/or the like) may obtain location data concerning a location of the first vehicle from the primary device associated with the first vehicle, as described above in connection with FIGS. 1A-1C.

As further shown in FIG. 5, process 500 may include processing the event data to determine a type of the event (block 520). For example, the server device (e.g., using processor 320, memory 330, storage component 340, and/or the like) may process the event data to determine a type of the event, as described above in connection with FIGS. 1A-1C.

As further shown in FIG. 5, process 500 may include determining, based on the type of the event and the location data, a proximity zone around the location of the first vehicle (block 525). For example, the server device (e.g., using processor 320, memory 330, storage component 340, and/or the like) may determine, based on the type of the event and the location data, a proximity zone around the location of the first vehicle, as described above in connection with FIGS. 1A-1C.

As further shown in FIG. 5, process 500 may include determining a plurality of additional devices within the proximity zone, wherein each additional device, of the plurality of additional devices, is associated with a vehicle different from the first vehicle (block 530). For example, the server device (e.g., using processor 320, memory 330, storage component 340, communication interface 370, and/or the like) may determine a plurality of additional devices within the proximity zone, as described above in connection with FIGS. 1A-1C. In some implementations, each additional device, of the plurality of additional devices, may be associated with a vehicle different from the first vehicle.

As further shown in FIG. 5, process 500 may include sending to the plurality of additional devices a message requesting additional video data concerning the event (block 535). For example, the server device (e.g., using processor 320, memory 330, storage component 340, communication interface 370, and/or the like) may send to the plurality of additional devices a message requesting additional video data concerning the event, as described above in connection with FIGS. 1A-1C.

As further shown in FIG. 5, process 500 may include obtaining the additional video data concerning the event from at least one additional device of the plurality of additional devices (block 540). For example, the server device (e.g., using processor 320, memory 330, storage component 340, input component 350, communication interface 370, and/or the like) may obtain the additional video data concerning the event from at least one additional device of the plurality of additional devices, as described above in connection with FIGS. 1A-1C.

As further shown in FIG. 5, process 500 may include processing the event data, the video data, and the additional video data to determine relevant event information (block 545). For example, the server device (e.g., using processor 320, memory 330, storage component 340, and/or the like) may process the event data, the video data, and the additional video data to determine relevant event information, as described above in connection with FIGS. 1A-1C.

As further shown in FIG. 5, process 500 may include performing, based on the relevant event information, an action concerning the event (block 550). For example, the server device (e.g., using processor 320, memory 330, storage component 340, input component 350, output component 360, communication interface 370, and/or the like) may perform, based on the relevant event information, an action concerning the event, as described above in connection with FIGS. 1A-1C.

Process 500 may include additional implementations, including any single implementation or any combination of implementations described below and/or in connection with one or more other processes described elsewhere herein.

In some implementations, when performing the action concerning the event, the server device may initiate a phone call to an emergency services provider, and may provide the relevant event information to the emergency services provider. In some implementations, when performing the action concerning the event, the server device may generate an event report based on the relevant event information, and may send the event report to a client device. In some implementations, when processing the event data to determine the type of the event, the server device may process the event data using an event classification algorithm, where the event classification algorithm is a machine learning algorithm.

In some implementations, when determining the plurality of additional devices within the proximity zone, the server device may send a location query to a set of additional devices that includes the plurality of additional devices, may obtain additional location data concerning a respective location of the vehicle different from the first vehicle with which each additional device of the set of additional devices is associated, and may compare the location data and the additional location data to determine the plurality of additional devices within the proximity zone.

In some implementations, when processing the event data, the video data, and the additional video data to determine the relevant event information, the server device may process the video data and the additional video data to identify one or more objects, may process, based on identifying the one or more objects, the video data and the additional video data to determine motion of the one or more objects, and may determine that the motion of the one or more objects caused or is related to the event.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
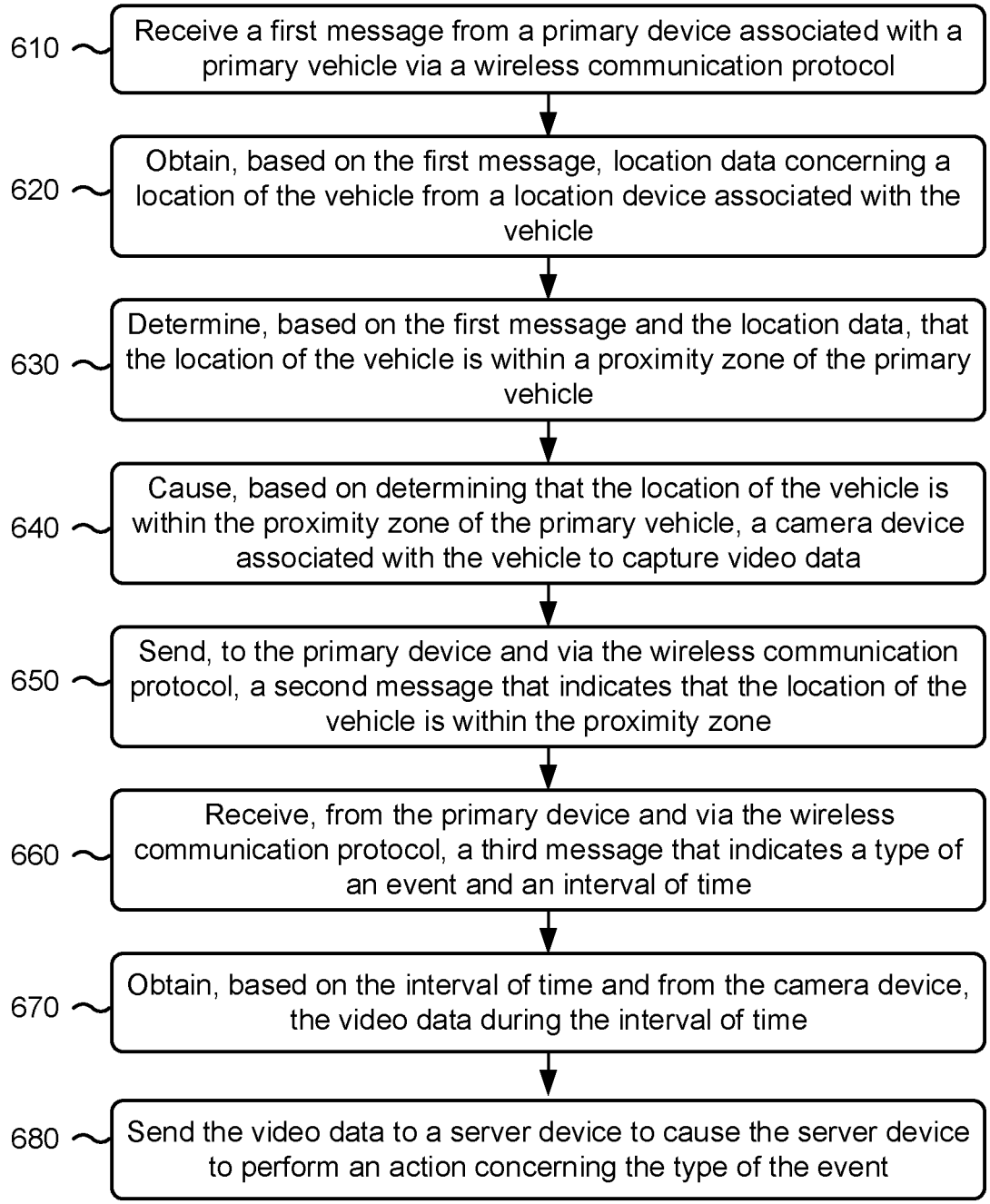

FIG. 6 is a flow chart of an example process 600 for detecting an event and automatically obtaining video data. In some implementations, one or more process blocks of FIG. 6 may be performed by a control device (e.g., control device 220-1). In some implementations, one or more process blocks of FIG. 6 may be performed by another device or a group of devices separate from or including the control device, such as vehicle 210, control device 210-1, detecting device 210-2, camera device 210-3, location device 210-4, vehicle 220, detecting device 220-2, camera device 220-3, location device 220-4, server device 230, and/or client device 240.

As shown in FIG. 6, process 600 may include receiving a first message from a primary device associated with a primary vehicle via a wireless communication protocol (block 610). For example, the control device (e.g., using processor 320, memory 330, storage component 340, input component 350, communication interface 370, and/or the like) may receive a first message from a primary device associated with a primary vehicle via a wireless communication protocol, as described above in connection with FIGS. 1A-1C.

As shown in FIG. 6, process 600 may include obtaining, based on the first message, location data concerning a location of the vehicle from a location device associated with the vehicle (block 620). For example, the control device (e.g., using processor 320, memory 330, storage component 340, input component 350, communication interface 370, and/or the like) may obtain, based on the first message, location data concerning a location of the vehicle from a location device associated with the vehicle, as described above in connection with FIGS. 1A-1C.

As shown in FIG. 6, process 600 may include determining, based on the first message and the location data, that the location of the vehicle is within a proximity zone of the primary vehicle (block 630). For example, the control device (e.g., using processor 320, memory 330, storage component 340, communication interface 370, and/or the like) may determine, based on the first message and the location data, that the location of the vehicle is within a proximity zone of the primary vehicle, as described above in connection with FIGS. 1A-1C.

As shown in FIG. 6, process 600 may include causing, based on determining that the location of the vehicle is within the proximity zone of the primary vehicle, a camera device associated with the vehicle to capture video data (block 640). For example, the control device (e.g., using processor 320, memory 330, storage component 340, input component 350, communication interface 370, and/or the like) may cause, based on determining that the location of the vehicle is within the proximity zone of the primary vehicle, a camera device associated with the vehicle to capture video data, as described above in connection with FIGS. 1A-1C.

As shown in FIG. 6, process 600 may include sending, to the primary device and via the wireless communication protocol, a second message that indicates that the location of the vehicle is within the proximity zone (block 650). For example, the control device (e.g., using processor 320, memory 330, storage component 340, communication interface 370, and/or the like) may send, to the primary device and via the wireless communication protocol, a second message that indicates that the location of the vehicle is within the proximity zone, as described above in connection with FIGS. 1A-1C.

As shown in FIG. 6, process 600 may include receiving, from the primary device and via the wireless communication protocol, a third message that indicates a type of an event and an interval of time (block 660). For example, the control device (e.g., using processor 320, memory 330, storage component 340, communication interface 370, and/or the like) may receive, from the primary device and via the wireless communication protocol, a third message that indicates a type of an event and an interval of time, as described above in connection with FIGS. 1A-1C.

As shown in FIG. 6, process 600 may include obtaining, based on the interval of time and from the camera device, the video data during the interval of time (block 670). For example, the control device (e.g., using processor 320, memory 330, storage component 340, input component 350, communication interface 370, and/or the like) may obtain, based on the interval of time and from the camera device, the video data during the interval of time, as described above in connection with FIGS. 1A-1C.

As shown in FIG. 6, process 600 may include sending the video data to a server device to cause the server device to perform an action concerning the type of the event (block 680). For example, the control device (e.g., using processor 320, memory 330, storage component 340, input component 350, output component 360, communication interface 370, and/or the like) may send the video data to a server device to cause the server device to perform an action concerning the type of the event, as described above in connection with FIGS. 1A-1C.

Process 600 may include additional implementations, including any single implementation or any combination of implementations described below and/or in connection with one or more other processes described elsewhere herein.

In some implementations, the wireless communication protocol may be a Bluetooth® wireless communication protocol that supports mesh networking. In some implementations, when causing the camera device associated with the vehicle to capture video data, the control device may cause one or more cameras associated with the camera device to point toward the primary vehicle.

In some implementations, the first message may indicate a location of the primary vehicle and the proximity zone of the primary vehicle, and, when determining that the location of the vehicle is within the proximity zone of the primary vehicle, the control device may determine, based on the first message and the location data, a distance between the location of the vehicle and the location of the primary vehicle, and may determine that the distance satisfies a threshold associated with the proximity zone. In some implementations, the control device may send, to the primary device and via the wireless communications protocol, a message that indicates that the video data has been sent to the server device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like, depending on the context.

It will be apparent that systems and/or methods, described herein, may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
obtaining, by a primary device and from a detecting device, event data concerning an event,
wherein the primary device and the detecting device are associated with a first vehicle, and
wherein the detecting device is associated with a sound level meter and the event data includes sound level data concerning the event;
determining, by the primary device and based on the event data, a type of the event,
the type of the event including at least one of:
a broken window event type,
an unauthorized entry event type,
a physical damage event type,
a vandalism event type, or
a personal harm event type, and
the type of the event being determined using a machine learning model,
the machine learning model being trained with historical event data associated with unauthorized entry event types, physical damage event types, vandalism event types, and personal harm event types;
obtaining, by the primary device and from a camera device, and based on the type of the event, video data concerning the event,
wherein the camera device is associated with the first vehicle;
obtaining, by the primary device and from a location device, and based on the type of the event, first location data concerning a location of the first vehicle,
wherein the location device is associated with the first vehicle;
determining, by the primary device, a proximity zone around the first vehicle,
wherein a size of the proximity zone is selectively determined based on the type of the event,
a first size of the proximity zone being selectively determined based upon a first type of event, or
a second size of the proximity zone being selectively determined based upon a second, different type of event;
sending, by the primary device, a location query to a plurality of additional devices;
receiving, by the primary device and from a device of the plurality of additional devices, second location data associated with a second vehicle,
the device being associated with the second vehicle;
determining, by the primary device, that the second vehicle is within the proximity zone;
sending, by the primary device and based on the type of the event, a message to the device associated with the second vehicle,
wherein the message requests the device to:
obtain at least one of:
additional event data concerning the event,
additional video data concerning the event, or
additional location data concerning a location of the second vehicle, and
send the at least one of the additional event data, the additional video data, or the additional location data concerning the location of the second vehicle to a server device;
sending, by the primary device, the type of the event, the video data, and the first location data concerning the location of the first vehicle to the server device to cause the server device to process the event data, the video data, the first location data concerning the location of the first vehicle, and the at least one of the additional event data, the additional video data, or the additional location data concerning the location of the second vehicle to determine relevant event information;

obtaining, by the primary device and from the server device, the relevant event information;
causing, by the primary device, storage of the relevant event information,
wherein the relevant event information includes a first portion of the video data and a second portion of the additional video data; and
causing, by the primary device, concurrent display of the first portion of the video data and the second portion of the additional video data.

2. The method of claim 1, wherein the detecting device is a microphone and the event data includes audio data concerning the event.

3. The method of claim 1, wherein obtaining the video data concerning the event from the camera device comprises:
determining, based on the event data, a start time of the event;
collecting the video data from the camera device relating to a first interval of time before the start time of the event;
collecting the video data from the camera device relating to a second interval of time after the start time of the event; and
joining the video data relating to the first interval of time and the video data relating to the second interval of time.

4. The method of claim 1, further comprising:
determining a correspondence between the first portion of the video data and the second portion of the additional video data;
synchronizing, based on the correspondence, the first portion of the video data and the second portion of the additional video data; and
wherein causing concurrent display of the first portion of the video data and the second portion of the additional video data comprises:
causing concurrent display of the first portion of the video data and the second portion of the additional video data based on synchronizing the first portion of the video data and the second portion of the additional video data.

5. A server device, comprising:
one or more memories; and
one or more processors, communicatively coupled to the one or more memories, configured to:
obtain event data concerning an event from a primary device associated with a first vehicle,
wherein the primary device is associated with a sound level meter and the event data includes sound level data concerning the event;
obtain video data concerning the event from the primary device associated with the first vehicle;
obtain first location data concerning a location of the first vehicle from the primary device associated with the first vehicle;
process the event data to determine a type of the event, the type of the event including at least one of:
a broken window event type,
an unauthorized entry event type,
a physical damage event type,
a vandalism event type, or
a personal harm event type, and
the type of the event being determined using a machine learning model,
the machine learning model being trained with historical event data associated with unauthorized entry event types, physical damage event types, vandalism event types, and personal harm event types;
determine, based on the type of the event and the first location data concerning the location of the first vehicle, a proximity zone around the location of the first vehicle,
wherein a size of the proximity zone is selectively determined based on the type of the event,
a first size of the proximity zone being selectively determined based upon a first type of the event, or
a second size of the proximity zone being selectively determined based upon a second, different type of the event;
send a location query to a plurality of additional devices;
receive, from a device of the plurality of additional devices, second location data associated with a second vehicle,
the device being associated with the second vehicle;
determine that the second vehicle is within the proximity zone;
send, to the device associated with the second vehicle, a message requesting additional video data concerning the event;
obtain the additional video data concerning the event from the device associated with the second vehicle;
process the event data, the video data, and the additional video data to determine relevant event information; and
perform, based on the relevant event information, an action concerning the event.

6. The server device of claim 5, wherein the one or more processors, when performing the action concerning the event, are configured to:
initiate a phone call to an emergency services provider; and
provide the relevant event information to the emergency services provider.

7. The server device of claim 5, wherein the one or more processors, when performing the action concerning the event, are configured to:
generate an event report based on the relevant event information; and
send the event report to a client device.

8. The server device of claim 5, wherein the one or more processors, when processing the event data to determine the type of the event using the machine learning model, are configured to:
process the event data using an event classification algorithm.

9. The server device of claim 5, wherein the one or more processors, when determining that the second vehicle is within the proximity zone, are configured to:
obtain additional location data concerning the second vehicle; and
compare the first location data concerning the location of the first vehicle and the additional location data concerning the second vehicle to determine that the second vehicle is within the proximity zone.

10. The server device of claim 5, wherein the one or more processors, when processing the event data, the video data, and the additional video data to determine the relevant event information, are configured to:
process the video data and the additional video data to identify one or more objects;

process, based on identifying the one or more objects, the video data and the additional video data to determine motion of the one or more objects; and determine that the motion of the one or more objects caused the event.

11. A non-transitory computer-readable medium storing instructions, the instructions comprising:

one or more instructions that, when executed by one or more processors of a device associated with a vehicle, cause the one or more processors to:

receive a first message from a primary device associated with a primary vehicle via a wireless communication protocol,
wherein the primary device is associated with a sound level meter and the first message includes sound level data concerning an event;

obtain, based on the first message, location data concerning a location of the vehicle from a location device associated with the vehicle;

determine, based on the first message and the location data concerning the location of the vehicle, that the location of the vehicle is within a proximity zone of the primary vehicle,
the proximity zone being selectively determined based on a type of event, the type of event including at least one of:
a broken window event type,
an unauthorized entry event type,
a physical damage event type,
a vandalism event type, or
a personal harm event type,
the type of event being determined using a machine learning model,
the machine learning model being trained with historical event data associated with unauthorized entry event types, physical damage event types, vandalism event types, and personal harm event types,
a first size of the proximity zone being selectively determined based upon a first type of event, or
a second size of the proximity zone being selectively determined based upon a second, different type of event;

cause, based on determining that the location of the vehicle is within the proximity zone of the primary vehicle, a camera device associated with the vehicle to capture video data;

send, to the primary device and via the wireless communication protocol, a second message that indicates that the location of the vehicle is within the proximity zone;

receive, from the primary device and via the wireless communication protocol, a third message that indicates the type of event and an interval of time;

obtain, based on the interval of time and from the camera device, the video data during the interval of time; and send the video data to a server device to cause the server device to perform an action concerning the type of event.

12. The non-transitory computer-readable medium of claim 11, wherein the wireless communication protocol is a Bluetooth® wireless communication protocol that supports mesh networking.

13. The non-transitory computer-readable medium of claim 11, wherein the one or more instructions, that cause the one or more processors to cause the camera device associated with the vehicle to capture the video data, cause the one or more processors to:

cause one or more cameras associated with the camera device to point toward the primary vehicle.

14. The non-transitory computer-readable medium of claim 11, wherein the first message indicates a location of the primary vehicle and the proximity zone of the primary vehicle, wherein the one or more instructions, when executed by the one or more processors, that cause the one or more processors to determine that the location of the vehicle is within the proximity zone of the primary vehicle, cause the one or more processors to:
determine, based on the first message and the location data concerning the location of the vehicle, a distance between the location of the vehicle and the location of the primary vehicle; and
determine that the distance satisfies a threshold associated with the proximity zone.

15. The non-transitory computer-readable medium of claim 11, wherein the one or more instructions further cause the one or more processors to:

send, to the primary device and via the wireless communications protocol, a fourth message that indicates that the video data has been sent to the server device.

16. The method of claim 1, wherein the proximity zone includes at least one of:

a geographic area around the first vehicle, or
a wireless communication range of the primary device associated with the first vehicle.

17. The method of claim 1, further comprising:

causing an alarm to go off on the first vehicle based on the relevant event information.

18. The device of claim 5, wherein the one or more processors are further to:

cause an alarm to go off on the first vehicle based on the relevant event information.

19. The method of claim 1, further comprising:

controlling the camera device to pivot on a pivot point to obtain the video data concerning the event.

20. The method of claim 1, further comprising:

controlling the camera device to adjust a focus to obtain the video data concerning the event.

* * * * *